US012655275B2

(12) United States Patent
Fini et al.

(10) Patent No.: US 12,655,275 B2
(45) Date of Patent: Jun. 16, 2026

(54) BIOCHAR ADDITIVES FOR BITUMINOUS COMPOSITES

(71) Applicant: Arizona Board of Regents on behalf of Arizona State University, Scottsdale, AZ (US)

(72) Inventors: Elham Fini, Phoenix, AZ (US); Shuguang Deng, Mesa, AZ (US); Amirul Islam Rajib, Tempe, AZ (US); Kodanda Phani Raj Dandamudi, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 458 days.

(21) Appl. No.: 18/020,038

(22) PCT Filed: Aug. 6, 2021

(86) PCT No.: PCT/US2021/045032
§ 371 (c)(1),
(2) Date: Feb. 6, 2023

(87) PCT Pub. No.: WO2022/032152
PCT Pub. Date: Feb. 10, 2022

(65) Prior Publication Data

US 2023/0303804 A1 Sep. 28, 2023

Related U.S. Application Data

(60) Provisional application No. 63/062,032, filed on Aug. 6, 2020.

(51) Int. Cl.
*C08L 95/00* (2006.01)
*C08K 11/00* (2006.01)

(52) U.S. Cl.
CPC ............ *C08K 11/005* (2013.01); *C08L 95/00* (2013.01)

(58) Field of Classification Search
CPC ............................. C08L 95/00; C08L 2555/00
See application file for complete search history.

(56) References Cited

U.S. PATENT DOCUMENTS

| | | | | |
|---|---|---|---|---|
| 2,182,837 | A | 12/1939 | Bacon | |
| 2,686,166 | A | 8/1954 | Taylor | |
| 10,077,454 | B1 | 9/2018 | Davis | |
| 2011/0294927 | A1 | 12/2011 | Williams et al. | |
| 2012/0090221 | A1* | 4/2012 | Banasiak | C10G 3/45 44/300 |
| 2013/0137154 | A1 | 5/2013 | Reep | |
| 2015/0128829 | A1* | 5/2015 | Huang | C08L 95/00 423/449.8 |
| 2015/0361318 | A1 | 12/2015 | Crews et al. | |
| 2017/0190898 | A1 | 7/2017 | Puchalski | |
| 2017/0247542 | A1 | 8/2017 | Williams | |
| 2017/0260371 | A1* | 9/2017 | Fini | B01D 3/40 |
| 2018/0148575 | A1 | 5/2018 | Kurth | |
| 2019/0106637 | A1 | 4/2019 | Oswald et al. | |
| 2019/0119499 | A1 | 4/2019 | Kurth | |
| 2019/0241847 | A1 | 8/2019 | Krivov | |
| 2019/0315662 | A1 | 10/2019 | Shearer et al. | |
| 2019/0345061 | A1* | 11/2019 | Ofori-Boadu | C04B 40/0042 |

FOREIGN PATENT DOCUMENTS

| | | | | |
|---|---|---|---|---|
| AU | 2015213412 A1 | 9/2015 | | |
| CN | 113145069 A | 7/2021 | | |
| DE | 102015013981 A1 | 3/2017 | | |
| GB | 1507332 | 4/1978 | | |
| WO | WO 2009016381 A2 | 2/2009 | | |
| WO | 2015127561 | 9/2015 | | |
| WO | WO-2019074499 A1 * | 4/2019 | | C10C 3/023 |

OTHER PUBLICATIONS

Walters, R.C., Fini, E.H., Abu-Lebdeh, T. "Enhancing Asphalt Rheological Behavior and Aging Susceptibility Using Bio-Char and Nano-Clay" American Journal of Engineering and Applied Sciences 7 (1): 66-76, 2014. ISSN: 1941-7020 doi:10.3844/ajeassp.2014.66.76 (Year: 2014).*
Abutalib, Nader, et al. "Investigating effects of application of silica fume to reduce asphalt oxidative aging." American Journal of Engineering and Applied Sciences 8.1 (2015): 176-184.
Airey, Gordon Dan. "State of the art report on ageing test methods for bituminous pavement materials." International Journal of Pavement Engineering 4.3 (2003): 165-176.
Asphalt Paving Association, Asphalt Paving Materials 2-1, "Asphalt and Asphalt Paving Materials", 2003, 1 page.
Balabaev, N. K., et al. "Modeling the structure of liquid monoethanolamine by molecular dynamics." Russian Journal of Physical Chemistry A 89 (2015): 398-405.
Cao, Zhilong, et al. "Investigation of ultraviolet aging resistance of bitumen modified by layered double hydroxides with different particle sizes." Construction and Building Materials 196 (2019): 166-174.
Chen, Wei, et al. "Transformation of nitrogen and evolution of N-containing species during algae pyrolysis." Environmental science & technology 51.11 (2017): 6570-6579.
Cong, Peiliang, Peijun Xu, and Shuanfa Chen. "Effects of carbon black on the anti aging, rheological and conductive properties of SBS/asphalt/carbon black composites." Construction and Building Materials 52 (2014): 306-313.

(Continued)

*Primary Examiner* — Alexandra M Moore
(74) *Attorney, Agent, or Firm* — Fish & Richardson P.C.

(57) ABSTRACT

Biochar can be used as an additive for bitumen. A bitumen composite includes bitumen and biochar. The biochar can include biochar from one or more of algae, food waste, animal waste, and cellulose-containing material (e.g., palm sheath). The biochar typically comprises 1 wt % to 20 wt % of the weight of the bitumen composite. The bitumen composite can be combined with aggregate to yield asphalt.

19 Claims, 8 Drawing Sheets

(56) References Cited

OTHER PUBLICATIONS

Dandamudi, Kodanda Phani Raj, et al. "Production of functionalized carbon from synergistic hydrothermal liquefaction of microalgae and swine manure." Resources, Conservation and Recycling 170 (2021): 105564.
De Sá Araujo, Maria de Fátima Amazonas, et al. "Weathering aging of modified asphalt binders." Fuel Processing Technology 115 (2013): 19-25.
Delley, Bernard. "An all-electron numerical method for solving the local density functional for polyatomic molecules." The Journal of chemical physics 92.1 (1990): 508-517.
Delley, Bernard. "From molecules to solids with the DMol 3 approach." The Journal of chemical physics 113.18 (2000): 7756-7764.
Exxon Mobil Corporation, "Paving Asphalt PG 64-22", ExxonMobil asphalt, United States, Performance Graded Aspault Cement, Product Data Sheet, 2 pages.
Fini, Elham H., et al. "Chemical characterization of biobinder from swine manure: Sustainable modifier for asphalt binder." Journal of Materials in Civil Engineering 23.11 (2011): 1506-1513.
Fini, Elham, et al. "Role of chemical composition of recycling agents in their interactions with oxidized asphaltene molecules." Journal of Materials in Civil Engineering 32.9 (2020): 04020268, 13 pages.
Fini, Elham H., et al. "Moisture damage and its relation to surface adsorption/desorption of rejuvenators." Industrial & Engineering Chemistry Research 59.30 (2020): 13414-13419.
Grimme, Stefan. "Density functional theory with London dispersion corrections." Wiley Interdisciplinary Reviews: Computational Molecular Science 1.2 (2011): 211-228.
Hagler, A. T., et al. "Consistent force field studies of intermolecular forces in hydrogen-bonded crystals. 2. A benchmark for the objective comparison of alternative force fields." Journal of the American Chemical Society 101.18 (1979): 5122-5130.
He, Xin, et al. "Accelerated aging Kinematics of asphalt by ultraviolet photooxidation considering moisture and condensation effects. " The National Academies of Sciences, Engineering, and Medicine, 01628574, 17-00109. Transportation Research Board, created 2017.
Hosseinnezhad, S., et al. "Physiochemical characterization of synthetic bio-oils produced from bio-mass: a sustainable source for construction bio-adhesives." RSC advances 5.92 (2015): 75519-75527.
Hosseinnezhad et al., "Multiscale Evaluation of Moisture Susceptibility of Biomodified Bitumen," ACS Applied Bio Materials, 2019, 2(12):5779-5789.
Hosseinnezhad, Shahrzad, et al. "Resistance mechanisms of biomodified binders against ultraviolet exposure." ACS sustainable chemistry & engineering 8.6 (2020): 2390-2398.
Hung, Albert M., et al. "Absorption spectroscopy to determine the extent and mechanisms of aging in bitumen and asphaltenes." Fuel 242 (2019): 408-415.
Hung, Albert M., et al. "Evolution of morphological and nanomechanical properties of bitumen thin films as a result of compositional changes due to ultraviolet radiation." ACS sustainable chemistry & engineering 7.21 (2019): 18005-18014.
Hung, Albert, and Elham H. Fini. "Surface morphology and chemical mapping of UV-aged thin films of bitumen." ACS Sustainable Chemistry & Engineering 8.31 (2020): 11764-11771.
Jimenez, Jose L., et al. "Evolution of organic aerosols in the atmosphere." science 326.5959 (2009): 1525-1529.
Karnati, Sidharth Reddy, et al. "Surface functionalization of silica nanoparticles to enhance aging resistance of asphalt binder." Construction and Building Materials 211 (2019): 1065-1072.
Karnati, S. R., et al. Application of surface-modified silica nanoparticles with dual silane coupling agents in bitumen for performance enhancement. Construction and Building Materials 2020, 244, 118324, 9 pages.
Khare, Peeyush, et al. "Asphalt-related emissions are a major missing nontraditional source of secondary organic aerosol precursors." Science advances 6.36 (2020): eabb9785, pp. 1-14.
Kriech, Anthony J., et al. "Assessing cancer hazards of bitumen emissions—a case study for complex petroleum substances." Critical Reviews in Toxicology 48.2 (2018): 121-142.
Lankone, Ronald S., et al. "Methodology for quantifying engineered nanomaterial release from diverse product matrices under outdoor weathering conditions and implications for life cycle assessment." Environmental Science: Nano 4.9 (2017): 1784-1797.
Liu, Fan, et al. "Facile preparation of N and O-rich porous carbon from palm sheath for highly selective separation of CO2/CH4/N2 gas-mixture." Chemical Engineering Journal 399 (2020): 125812.
Mattsson, Thomas R., et al. "First-principles and classical molecular dynamics simulation of shocked polymers." Physical Review B 81.5 (2010): 054103.
McHenry, Mark P. "Agricultural bio-char production, renewable energy generation and farm carbon sequestration in Western Australia: Certainty, uncertainty and risk." Agriculture, Ecosystems & Environment 129.1-3 (2009): 1-7.
Menapace, I., et al. Chemical analysis of surface and bulk of asphalt binders aged with accelerated weathering tester and standard aging methods. Fuel 2017, 202, 366-379. 10.1016/j.fuel.2017.04.042.
Mousavi, Masoumeh, et al. "Multiscale investigation of oxidative aging in biomodified asphalt binder." The Journal of Physical Chemistry C 120.31 (2016): 17224-17233.
Mousavi, Masoumeh, et al. "Underlying molecular interactions between sodium montmorillonite clay and acidic bitumen." The Journal of Physical Chemistry C 123.25 (2019): 15513-15522.
Mousavi, Masoumeh, et al. "Silanization mechanism of silica nanoparticles in bitumen using 3-aminopropyl triethoxysilane (APTES) and 3-glycidyloxypropyl trimethoxysilane (GPTMS)." ACS sustainable chemistry & engineering 8.8 (2020): 3231-3240.
Nakhaei, Mostafa, et al. "Aging evaluation of amorphous carbon-modified asphalt binders using rheological and chemical approach." Journal of Materials in Civil Engineering 32.1 (2020): 04019321.
Oldham, Daniel J., et al. "Durability of bio-modified recycled asphalt shingles exposed to oxidation aging and extended sub-zero conditioning." Construction and building materials 208 (2019): 543-553.
Oldham, Daniel J., et al. "Introducing the critical aging point (CAP) of asphalt based on its restoration capacity." Construction and Building Materials 278 (2021): 122379.
Pahlavan, Farideh, et al. "Alteration of TT-electron distribution to induce deagglomeration in oxidized polar aromatics and asphaltenes in an aged asphalt binder." ACS sustainable chemistry & engineering 6.5 (2018): 6554-6569.
Pahlavan, Farideh, et al. "Characterization of oxidized asphaltenes and the restorative effect of a bio-modifier." Fuel 212 (2018): 593-604.
Pahlavan, Farideh, et al. "Exploiting synergistic effects of intermolecular interactions to synthesize hybrid rejuvenators to revitalize aged asphalt." ACS Sustainable Chemistry & Engineering 7.18 (2019): 15514-15525.
Pahlavan, Farideh, et al. "Investigation of balanced feedstocks of lipids and proteins to synthesize highly effective rejuvenators for oxidized asphalt." ACS Sustainable Chemistry & Engineering 8.20 (2020): 7656-7667.
Payne, James R., and Charles R. Phillips. "Photochemistry of petroleum in water." Environmental science & technology 19.7 (1985): 569-579.
Perdew, John P., Kieron Burke, and Matthias Ernzerhof. "Generalized gradient approximation made simple." Physical review letters 77.18 (1996): 3865-3868.
Petersen, J. Claine. "A review of the fundamentals of asphalt oxidation: chemical, physicochemical, physical property, and durability relationships." Transportation research circular E-C140 (2009), pp. 1-78.
Rajib, Amirul, et al. "Enhancing biomass value chain by utilizing biochar as a free radical scavenger to delay ultraviolet aging of bituminous composites used in outdoor construction." Resources, Conservation and Recycling 168 (2021): 105302.
Ruiz, Jesús, et al. "Towards industrial products from microalgae." Energy & Environmental Science 9.10 (2016): 3036-3043.

(56) References Cited

OTHER PUBLICATIONS

Samieadel, Alireza, et al. "Investigating molecular conformation and packing of oxidized asphaltene molecules in presence of paraffin wax." Fuel 220 (2018): 503-512.
Sengupta, Manajit, et al. "The national solar radiation data base (NSRDB)." Renewable and sustainable energy reviews 89 (2018): 51-60.
Tersoff, J. "Modeling solid-state chemistry: Interatomic potentials for multicomponent systems." Physical review B 39.8 (1989): 5566.
Walters, R. C., Fini, E. H., & Abu-Lebdeh, T. (2014). Enhancing asphalt rheological behavior and aging susceptibility using bio-char and nano-clay. American Journal of Engineering and Applied Sciences, 7(1), 66-76.
Wang, Haopeng, et al. "Characterization of bitumen modified with pyrolytic carbon black from scrap tires." Sustainability 11.6 (2019): 1631.
Wang, He, et al. "In-situ Pyrolysis of Taihu blue algae biomass as appealing porous carbon adsorbent for CO2 capture: Role of the intrinsic N." Science of the Total Environment 771 (2021): 145424.
Let, Alexandru Liviu, WO2019/074499, "Biochar-modified bitumen", International application No. PCT/US2017/056135, published Apr. 18, 2019, 32 pages.
Wu, Shaopeng, et al. "Rheological properties for aged bitumen containing ultraviolate light resistant materials." Construction and Building Materials 33 (2012): 133-138.
Xu, Song, et al. "Effect of ultraviolet aging on rheological properties of organic intercalated layered double hydroxides modified asphalt." Construction and Building Materials 75 (2015): 421-428.
Xu, Song, et al. "Effect of layered double hydroxides on ultraviolet aging resistance of SBS modified bitumen membrane." Journal of Wuhan University of Technology-Mater. Sci. Ed. 30 (2015): 494-499.
Zadshir, Mehdi, et al. "Application of a biomodifier as fog sealants to delay ultraviolet aging of bituminous materials." Journal of Materials in Civil Engineering 30.12 (2018): 04018310.
Zeng, Wenbo, et al. "Research on Ultra Violet (UV) aging depth of asphalts." Construction and Building Materials 160 (2018): 620-627.
Zhang, Canlin, et al. "Influence of UV aging on the rheological properties of bitumen modified with surface organic layered double hydroxides." Construction and Building Materials 123 (2016): 574-580.
Zhang, Peixin, et al. "Algae-derived N-doped porous carbons with ultrahigh specific surface area for highly selective separation of light hydrocarbons." Chemical Engineering Journal 381 (2020): 122731.
Balabaev, N. K., et al. "Molecular-dynamic study of liquid ethylenediamine." Russian Journal of Physical Chemistry A 90 (2016): 1986-1992.
Boehm, Hans P. "Chemical identification of surface groups." Advances in catalysis. vol. 16. Academic Press, 1966. 179-274.
Boehm, H.P. "Surface oxides on carbon and their analysis: a critical assessment." Carbon 40.2 (2002): 145-149.
Bowers, Benjamin F., et al. "Refining laboratory procedure for artificial RAP: A comparative study." Construction and building materials 52 (2014): 385-390.
Chen, Wei, et al. "Algae pyrolytic poly-generation: Influence of component difference and temperature on products characteristics." Energy 131 (2017): 1-12.
Cole, Andrew, et al. "From macroalgae to liquid fuel via waste-water remediation, hydrothermal upgrading, carbon dioxide hydrogenation and hydrotreating." Energy & Environmental Science 9.5 (2016): 1828-1840.
Cong, Peiliang, et al. "Physical and rheological properties of asphalt binders containing various antiaging agents." Fuel 97 (2012): 678-684.
Craven, J. S., et al. "Analysis of secondary organic aerosol formation and aging using positive matrix factorization of high-resolution aerosol mass spectra: application to the dodecane low-NO x system." Atmospheric Chemistry and Physics 12.24 (2012): 11795-11817.
Demirbas, Ayhan, et al. "Importance of algae oil as a source of biodiesel." Energy conversion and management 52.1 (2011): 163-170.
Drage, Trevor C., et al. "Preparation of carbon dioxide adsorbents from the chemical activation of urea-formaldehyde and melamine-formaldehyde resins." Fuel 86.1-2 (2007): 22-31.
Ervens, B., et al. "Secondary organic aerosol formation in cloud droplets and aqueous particles (aqSOA): a review of laboratory, field and model studies." Atmospheric Chemistry and Physics 11.21 (2011): 11069-11102.
Feng, Zhen-gang, et al. "FTIR analysis of UV aging on bitumen and its fractions." Materials and Structures 49 (2016): 1381-1389.
Feng, Zhen-gang, et al. "FTIR and rheology analysis of aging on different ultraviolet absorber modified bitumens." Construction and Building Materials 115 (2016): 48-53.
Friebel, J., et al. "The fate of nitrogen during pyrolysis of German low rank coals—a parameter study." Fuel 78.8 (1999): 923-932.
Feng, Zhen-Gang, et al. "Effect of ultraviolet aging on rheology, chemistry and morphology of ultraviolet absorber modified bitumen." Materials and Structures 46 (2013): 1123-1132.
Ghosh, Suraj, et al. "Source and chemical species characterization of PM10 and human health risk assessment of semi-urban, urban and industrial areas of West Bengal, India." Chemosphere 207 (2018): 626-636.
Grimme, Stefan, et al. "A consistent and accurate ab initio parametrization of density functional dispersion correction (DFT-D) for the 94 elements H-Pu." The Journal of chemical physics 132.15 (2010).
Guo, Yang, et al. "A review of bio-oil production from hydrothermal liquefaction of algae." Renewable and Sustainable Energy Reviews 48 (2015): 776-790.
Harlick, P. J. E., and A. Sayari. "Amine grafted, pore-expanded MCM-41 for acid gas removal: Effect of grafting temperature, water, and amine type on performance." Studies in Surface Science and Catalysis. vol. 158. Elsevier, 2005. 987-994.
Hays, Michael D., et al. "Nature of unresolved complex mixture in size-distributed emissions from residential wood combustion as measured by thermal desorption-gas chromatography-mass spectrometry." Journal of Geophysical Research: Atmospheres 109.D16 (2004).
He, Xin, et al. "Accelerated aging of asphalt by UV photo-oxidation considering moisture and condensation effects." created 2017, 01628574, 2 pages.
Heald, C. L., et al. "Predicted change in global secondary organic aerosol concentrations in response to future climate, emissions, and land use change." Journal of Geophysical Research: Atmospheres 113.D5 (2008).
Herrington, Philip R. "Diffusion and reaction of oxygen in bitumen films." Fuel 94 (2012): 86-92.
Hiyoshi, N., et al. "Adsorption of carbon dioxide on modified mesoporous materials in the presence of water vapor." Studies in Surface Science and Catalysis. vol. 154. Elsevier, 2004. 2995-3002.
Hofko, Bernhard, et al. "Repeatability and sensitivity of FTIR ATR spectral analysis methods for bituminous binders." Materials and Structures 50 (2017): 1-15.
Houshmand, Amirhossein, et al. "Carbon dioxide capture with amine-grafted activated carbon." Water, Air, & Soil Pollution 223 (2012): 827-835.
Hung, Albert M., et al. "Implication of wax on hindering self-healing processes in bitumen." Applied Surface Science 523 (2020): 146449.
Iinuma, Yoshiteru, et al. "Method development for the analysis of particle phase substituted methoxy phenols and aromatic acids from biomass burning using capillary electrophoresis/electrospray ionization mass spectrometry (CE/ESI-MS)." Journal of Chromatography A 1018.1 (2003): 105-115.
Kanellopoulos, Panagiotis Georgios, et al. "Primary and secondary organic aerosol in an urban/industrial site: Sources, health implications and the role of plastic enriched waste burning." Journal of Environmental Sciences 99 (2021): 222-238.

(56) References Cited

OTHER PUBLICATIONS

Karnati, Sidharth Reddy, et al. "Developing carbon nanoparticles with tunable morphology and surface chemistry for use in construction." Construction and Building Materials 262 (2020): 120780.
Keiluweit, Marco, et al. "Dynamic molecular structure of plant biomass-derived black carbon (biochar)." Environmental science & technology 44.4 (2010): 1247-1253.
Kelemen, Simon R., et al. "Nitrogen transformations in coal during pyrolysis." Energy & fuels 12.1 (1998): 159-173.
Khare, Peeyush, and Drew R. Gentner. "Considering the future of anthropogenic gas-phase organic compound emissions and the increasing influence of non-combustion sources on urban air quality." Atmospheric Chemistry and Physics 18.8 (2018): 5391-5413.
Knowles, Gregory P., et al. "Aminopropyl-functionalized mesoporous silicas as CO2 adsorbents." Fuel Processing Technology 86.14-15 (2005): 1435-1448.
Liu, Huan, et al. "Catalytic role of conditioner CaO in nitrogen transformation during sewage sludge pyrolysis." Proceedings of the Combustion Institute 35.3 (2015): 2759-2766.
Liu, Yu, et al. "Aqueous-phase production of secondary organic aerosols from oxidation of dibenzothiophene (DBT)." Atmosphere 11.2 (2020): 151.
Lohmann, Ulrike, and Johann Feichter. "Global indirect aerosol effects: a review." Atmospheric Chemistry and Physics 5.3 (2005): 715-737.
Maroto-Valer, M. Mercedes, et al. "CO2 capture by activated and impregnated anthracites." Fuel Processing Technology 86.14-15 (2005): 1487-1502.
McDonald, Brian C., et al. "Volatile chemical products emerging as largest petrochemical source of urban organic emissions." Science 359.6377 (2018): 760-764.
Montes-Morán, M. A., et al. "On the nature of basic sites on carbon surfaces: an overview." Carbon 42.7 (2004): 1219-1225.
Moreira, Diana, and José CM Pires. "Atmospheric CO2 capture by algae: negative carbon dioxide emission path." Bioresource technology 215 (2016): 371-379.
Mousavi, Masoumeh, et al. "Alteration of intermolecular interactions between units of asphaltene dimers exposed to an amide-enriched modifier." RSC advances 6.58 (2016): 53477-53492.
Muppaneni, Tapaswy, et al. "Ethanolysis of camelina oil under supercritical condition with hexane as a co-solvent." Applied Energy 94 (2012): 84-88.
Naskar, M., et al. "Effect of ageing on different modified bituminous binders: comparison between RTFOT and radiation ageing." Materials and Structures 46 (2013): 1227-1241.
Oldham, Daniel, et al. "Investigating bitumen rejuvenation mechanisms using a coupled rheometry-morphology characterization approach." Construction and Building Materials 159 (2018): 37-45.
Pahlavan, Farideh, et al. "Evolution of molecular packing and rheology in asphalt binder during rejuvenation." Fuel 222 (2018): 457-464.
Pan, Pan, et al. "Influence of graphite on the thermal characteristics and anti-ageing properties of asphalt binder." Construction and Building Materials 68 (2014): 220-226.
Petersen, J. Claine. "Chemical composition of asphalt as related to asphalt durability." Developments in petroleum science. vol. 40. Elsevier, 2000. 363-399.
Rajib, Amirul I., et al. "Do all rejuvenators improve asphalt performance?." Road Materials and Pavement Design 23.2 (2022): 358-376.
Rogge, Wolfgang F., et al. "Sources of fine organic aerosol. 2. Noncatalyst and catalyst-equipped automobiles and heavy-duty diesel trucks." Environmental science & technology 27.4 (1993): 636-651.
Rogge, Wolfgang F., et al. "Sources of fine organic aerosol. 3. Road dust, tire debris, and organometallic brake lining dust: roads as sources and sinks." Environmental Science & Technology 27.9 (1993): 1892-1904.
Rosenfeld, Daniel, et al. "Climate effects of aerosol-cloud interactions." Science 343.6169 (2014): 379-380.
Saha, Dipendu, et al. "Synthesis of nitrogen and sulfur codoped nanoporous carbons from algae: role in CO2 separation." ACS omega 3.12 (2018): 18592-18602.
Sevilla, Marta, et al. "High-performance CO 2 sorbents from algae." RSC advances 2.33 (2012): 12792-12797.
Tian, Zhongwei, et al. "The direct carbonization of algae biomass to hierarchical porous carbons and CO2 adsorption properties." Materials Letters 180 (2016): 162-165.
Van Duin, Adri CT, et al. "ReaxFF: a reactive force field for hydrocarbons." The Journal of Physical Chemistry A 105.41 (2001): 9396-9409.
Wu, Shaopeng, et al. "Evaluation of aging resistance of graphene oxide modified asphalt." Applied Sciences 7.7 (2017): 702.
Yousif, Emad, et al. "Photodegradation and photostabilization of polymers, especially polystyrene: review" SpringerPlus 2:398 (2013): 1-32.
Wen, Yong, and Yuhong Wang. "Determination of oxygen diffusion coefficients of compacted asphalt mixtures." Construction and Building Materials 160 (2018): 385-398.
Yu, Jian-Ying, et al. "Effect of organo-montmorillonite on aging properties of asphalt." Construction and Building Materials 23.7 (2009): 2636-2640.
Zhang, Henglong, et al. "Influence of surface modification on physical and ultraviolet aging resistance of bitumen containing inorganic nanoparticles." Construction and Building Materials 98 (2015): 735-740.
Zhang, Xianghe, et al. "Mechanism and kinetic study of the reaction of benzoic acid with OH, NO 3 and SO 4—radicals in the atmosphere." RSC advances 9.33 (2019): 18971-18977.
Zhou, Xinxing, et al. "Effects of biochar on the chemical changes and phase separation of bio-asphalt under different aging conditions." Journal of cleaner production 263 (2020): 121532.
Amin, Sarmidi. "Review on biofuel oil and gas production processes from microalgae." Energy conversion and management 50.7 (2009): 1834-1840.
Apeagyei, Alex K. "Laboratory evaluation of antioxidants for asphalt binders." Construction and Building Materials 25.1 (2011): 47-53.
Andrady, A. L., et al. "Effects of solar UV and climate change on materials." Photochemical & Photobiological Sciences 10 (2011): 292-300.
Chan, A.; Kreisberg, N.; Hohaus, T.; Campuzano-Jost, P.; Zhao, Y.; Day, D.; Kaser, L.; Karl, T.; Hansel, A.; Teng, A. J. A. c.; physics, Speciated measurements of semivolatile and intermediate volatility organic compounds (S/IVOCs) in a pine forest during Beachon-Rombas 2011. 2016, 16 (2), 1187-1205.
Fini, E. H.; Oldham, D.; Buabeng, F. S.; Nezhad, S. H.: Investigating the Aging Susceptibility of Bio-Modified Asphalts. In Airfield and Highway Pavements 2015, 2015; pp. 62-73.
Khare, P.; Marcotte, A.; Sheu, R.; Walsh, A. N.; Ditto, J. C.; Gentner, D. R. J. J. o. C. A., Advances in offline approaches for trace measurements of complex organic compound mixtures via soft ionization and high-resolution tandem mass spectrometry. 2019, 1598, 163-174.
Rajib, A.; Fini, E. H. Inherently Functionalized Carbon from Lipid and Protein-Rich Biomass to Reduce Ultraviolet-Induced Damages in Bituminous Materials. ACS Omega 2020, 5, 25273-25280.
Sajjadi, B.; Zubatiuk, T.; Leszczynska, D.; Leszczynski, J.; Chen, W. Y. J. R. i. C. E., Chemical activation of biochar for energy and environmental applications: a comprehensive review. 2019, 35 (7), 777-815.
Pomerantz et al., "Sulfur speciation in kerogen and bitumen from gas and oil shales," Organic Geochemistry, Dec. 2013, 68(31):5-12.
Ng et al., "Detection of cis-Vaccenic Acid in Palm Oil by 13C NMR Spectroscopy," Lipids, 1988, 23:140-143.
Maria et al., "Peanut oil: Compositional data," Review Article European Journal of Lipid Science and Technology, Jul. 2010, 112(7):697-707.
Abdullah et al., "Identification of Hydrophilic Phenolic Compounds Derived from Palm Oil Products," Journal of Oil Palm Research, Jun. 2020, 32(2):258-270.

(56) References Cited

OTHER PUBLICATIONS

Dhasmana et al. "Rheological and Chemical Characterization of Biobinders from Different Biomass Resources" Published: Apr. 28, 2019. Journal of the Transporation Research Board No. 2505. pp. 121-129. (Year: 2019).
Adroit Market Resaerch, Speciality and Fine Chemicals, https://www.adroitmarketresearch.com/industry-reports/polymer-modified-bitumen-pmb-market, accessed Jan. 11, 2025.
Rajib, A. I., Pahlavan, F., & Fini, E. H. (2020b). Investigating Molecular-Level Factors That Affect the Durability of Restored Aged Asphalt Binder. Journal of Cleaner Production, 122501. doi:https://doi.org/10.1016/j.jclepro.2020.122501.
Pahlavan, F., A. I. Rajib, E. H. Fini, 2020, Using the Synergy between Lipid-rich and Protein-rich Biomass to Synthesize Effective Bio-Rejuvenators for Oxidized Asphaltenes, ACS Sustainable Chemistry & Engineering, https://doi.org/10.1021/acssuschemeng.0c01100. (IF: 6.970).
Arenillas, A.; Rubiera, F.; Parra, J.; Ania, C.; Pis, J. J. A. S. S., Surface modification of low cost carbons for their application in the environmental protection. 2005, 252 (3), 619-624.
ASTM D7175-05. Standard Test Method for Determining the Rheological Properties of Asphalt Binder Using a Dynamic Shear Rheometer. In Annual Book of ASTM Standards; ASTM International: West Conshohocken, PA, 2017; vol. 04.03, 16 pages.
Radovic, L. R.; Moreno-Castilla, C.; Rivera-Utrilla, J. J. C.; carbon, p. o., Carbon materials as adsorbents in aqueous solutions. 2001, 227-406.
Simone Alves da Silva, Polycyclic aromatic hydrocarbons content and fatty acids profile in coconut, safflower, evening primrose, and linseed oils, 2018, Food Chemistry (Elsevier), 798-805. (Year: 2018).
Hosseinnezhad et al., "Differential effects of ultraviolet radiation and oxidative aging on bio-modified binders," Fuel, vol. 251, pp. 45-56, 2019.

* cited by examiner

BIOCHAR ADDITIVES FOR BITUMINOUS COMPOSITES

CROSS-REFERENCE TO RELATED APPLICATION

This application is a National Stage Application of International Application No. PCT/US2021/045032, filed Aug. 6, 2021, which claims the benefit of U.S. Patent Application No. 63/062,032 entitled "BIOCHAR ADDITIVES FOR BITUMINOUS COMPOSITES" and filed on Aug. 6, 2020, both of which are incorporated herein by reference in their entirety.

STATEMENT OF GOVERNMENT INTEREST

This invention was made with government support under 1928807 and 1935723 awarded by the National Science Foundation. The government has certain rights in the invention.

TECHNICAL FIELD

This invention relates to biochar additives for bituminous composites, as well as bituminous composites with anti-aging properties imparted by biochar additives.

BACKGROUND

Bituminous composites used in road and airport pavements, driveways, parking lots, and roofing shingles typically contain stone aggregate and bitumen, which works as a glue to bind the stones together. These composites become brittle with age and environmental exposure. Ultraviolet (UV) aging degrades bituminous composites and leads to premature cracking. Cracks allow water and debris into the underlying structures, further accelerating damage as a result of chemical oxidation and loss of volatiles in the bitumen upon exposure to heat, air, water, and UV radiation. Chemical oxidation is a consistent marker of aging, manifesting as an increase in carbonyl (C═O) and sulfoxide (S═O) groups, as well as some graphitization. These changes increase the strength of intermolecular bonding and aggregation in bitumen, leading to increased stiffness and reduced ductility. Oxidation typically proceeds through the formation of peroxides and related free-radical intermediates. Susceptibility to oxidative aging depends on both the chemical reactivity of bitumen (ether and ethylene groups are particularly prone to peroxidation, for example) and the diffusivity of oxygen and other reactive intermediates. Volatile loss of small molecules (roughly <300 Da) that might otherwise act as plasticizers in the matrix is also thought to depend strongly on bitumen composition and diffusivity. UV light can directly break chemical bonds and initiate reactions, yielding chemical products different from those of thermal aging and at a much faster rate. Thus, the durability of bituminous composites and associated construction materials is often limited by environmental factors.

SUMMARY

Biochar additives for extending the service life of bituminous composites, as well as bituminous composites including biochar additives, are disclosed. As used herein, "biochar" generally refers to functionalized carbon derived from pyrolysis or thermochemical liquefaction of biomass, e.g., as a byproduct of biodiesel production). In one example, algal biochar is derived from pyrolysis or thermochemical liquefaction of algae. The biochar works as a free-radical scavenger in a bituminous matrix to delay ultraviolet aging.

In a first general aspect, a bitumen composite includes bitumen and biochar. The biochar comprises 1 wt % to 20 wt % of the bitumen composite.

Implementations of the first general aspect may include one or more of the following features.

The biochar can comprise 1 wt % to 15 wt %, 1 wt % to 10 wt %, 5 wt % to 15 wt %, 1 wt % to 5 wt %, 5 wt % to 10 wt %, 10 wt % to 15 wt %, or 15 wt % to 20 wt % of the bitumen composite. The biochar can include biochar from algae, food waste, animal waste, cellulose-containing material (e.g., palm sheath), or any combination thereof.

In a second general aspect, an asphalt includes the bitumen composite of the first general aspect.

The third general aspect is a bitumen additive comprising biochar.

In a fourth general aspect, making a bitumen composite includes combining biochar with bitumen to yield a modified bitumen and homogenizing the modified bitumen to yield a bitumen composite.

Implementations of the fourth general aspect may include one or more of the following features.

The biochar can be a by-product of biofuel production. In some cases, the biochar is derived from liquefaction, such thermochemical liquefaction or hydrothermal liquefaction. In certain cases, the biochar is derived from pyrolysis. The biochar is typically 1 wt % to 20 wt % of the bitumen composite. The biochar can be biochar from algae, food waste, animal waste, cellulose-containing material, or a combination thereof. The bitumen composite can be combined with an aggregate to yield asphalt.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
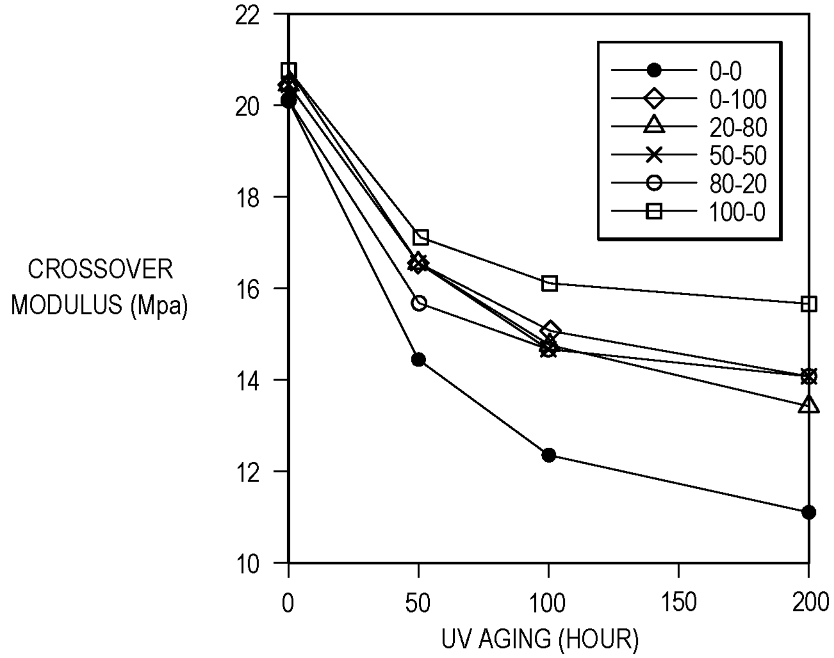
FIGS. 1A and 1B show crossover modulus and crossover frequency, respectively, for different aging levels of asphalt with and without biochar.

Asphalt aging is implicated in many distresses of materials used in the roofing and paving industry. Bitumen is the glue used in roof shingles and asphalt pavement; aged bitumen has a loss of stress relaxation capacity and an increased propensity to thermal cracking due to excessive hardening. Bitumen is part of the asphalt composites used in roofing and pavements, which undergo intense weathering during their service life. The degree of aging of asphalt composites used in roofing and pavements depends on the geographic location, temperature, solar radiation, and the composition of materials. Aging is a prevalent type of failure in asphalt composites used in regions with high solar irradiance. Construction materials in regions with high solar irradiance are susceptible to accelerated aging, due at least in part to high solar irradiance and high temperatures. Increased ultraviolet (UV) radiation decreases the outdoor service life of construction materials such as plastics, rubber, and wood materials. This is especially notable for asphalt composites having high UV blocking capacity; the UV heats the asphalt matrix and negatively impacts its thermomechanical properties.

Biochar additives for bitumen composites as well as bitumen composites with biochar additives are disclosed. Biochar is a by-product of biofuel production. Biochar includes residues from pyrolysis and thermochemical or hydrothermal liquefaction of biomass, such as algae, biowaste (e.g., food waste and animal waste, agricultural waste), cellulose-containing matter (e.g., palm sheath or wood such as pine and juniper), or any combination thereof. Biochars may have different chemical properties and may provide different advantages. For example, algal biochar is rich in protein and nucleic acids, and animal waste biochar is rich in lipids. The formation of biochar results in functionalization of carbon in the biochar.

Biochar functions as a free-radical scavenger, an ultraviolet blocker, or both when mixed with bitumen. The efficacy of biochar as a free radical scavenger and ultraviolet blocker is attributed at least in part to high surface area of the biochar and functional groups in the biochar. Functional groups (or compounds) include oxygen-containing functional groups (or compounds) such as alcohols (e.g., phenols), ketones, lactones, and carboxylic acids and nitrogen-containing functional groups (or compounds) such as amines (e.g., ethylenediamine, pyrrole, pyridine), amides (e.g., nonadecanamide), diimides, and azides. In some cases, the biochar contains polyaromatic rings connected through polyphosphate bridges. Functional groups on the biochar can promote adsorption and decomposition (e.g., through deamination and decarboxylation) of organic compounds (e.g., air pollutants) emitted from bitumen. The organic compounds can be precursors to secondary organic aerosols. Examples of these organic compounds include hydrocarbons, oxygen-containing compounds such as benzoic acid, benzofuran, and hexanal), and sulfur containing compounds such as dibenzothiophene, 3-pentythiophene, and hexanethiol). The biochar micropores and the heteroatoms present in the functional compounds or groups work synergistically to enhance gas adsorption by the biochar.

Bitumen composites with biochar additives can decrease degradation caused by exposure to UV radiation (i.e., sunlight). Biochar can be combined with neat asphalt in a range of about 1 wt % to about 20 wt % (e.g., 1 wt % to 15 wt %, 1 wt % to 10 wt %, 5 wt % to 15 wt %, 1 wt % to 5 wt %, 5 wt % to 10 wt %, 10 wt % to 15 wt %, 15 wt % to 20 wt % or 5 wt %, 10 wt %, 15 wt %, or 20% wt %) of the base bitumen. In one example, a bitumen composite including about 5 wt % biochar decreased degradation can be manifested as an improvement in aging resistance of about 35% to about 60%, resulting in a longer outdoor service life of the bitumen composite. In some cases, the functionalized biochar can serve as a replacement for asphalt.

To test the efficacy of biochar in limiting thermo-oxidative aging in bitumen, fresh bitumen (e.g., Superpave PG64-22, a grade commonly used in the U.S.) can be mixed with a specified amount of biochar and subjected to standard laboratory aging. Short-term aging can be simulated using a rolling thin-film oven (RTFO, ASTM D2872). To simulate long-term aging, RTFO aging can be followed by 20 h in a pressure aging vessel (PAV, ASTM D6521). An additional cycle of PAV aging (40 h total, or 2PAV) may be used to better represent the extended aging of asphalt pavement through its service life.

Rheological and chemical characterization of biochar-bitumen blends can be used to quantify the extent of degradation. A dynamic shear rheometer (DSR) can be used to measure the complex modulus G* before and after aging and to calculate the rough aging index (AI) metric of Equation 1:

$$AI = G^*_{aged}/G^*_{unaged} \tag{1}$$

A common chemical metric of oxidation is the carbonyl index ($I_{C=O}$) calculated from integrated peak intensities of FTIR spectra, although exact ways of calculating $I_{C=O}$ can vary. The difference in $I_{C=O}$ between aged and unaged samples gives the chemical aging index of Equation (2):

$$\Delta I_{C=O} = \frac{(I_{C=O})_{RTFO/PAV} - (I_{C=O})_{unaged}}{(I_{C=O})_{unaged}} \tag{2}$$

The lower values of AI and $\Delta I_{C=O}$ indicate better aging resistance of the bitumen blend. Table 1 shows the effects of three different types of biochar (wood, algae, and manure) on aging resistance of bitumen. The three biochar types demonstrated performance superior to that of control bitumen; however, biochar efficacy varied based on the source, with algae and wood-based showing higher resistance than manure-based biochar.

TABLE 1

Thermo-oxidative aging of biochar-bitumen blends

| Aging index after 200 hr of accelerated aging | Control Bitumen | Bitumen containing various biochar: Wood | Algae | Manure |
|---|---|---|---|---|
| Rheological aging index (AI) | 44.96 | 17.46 | 24.75 | 31.09 |
| Chemical aging index ($\Delta I_{C=O}$) | 40.36 | 23.27 | 20.82 | 38.62 |

Typically, the use of solid additives in bitumen is limited to 10-15% by the weight of the base bitumen (e.g., to minimize phase separation which is exacerbated by aging). In addition, the concentration of solid could lead to excessive stiffness in the bituminous composites promoting susceptibility to cracking. The stability of each blend can be evaluated with a hot-storage test. The test follows ASTM D36 and can be used to test the susceptibility of bitumen blends to phase separation or sedimentation over time (storage stability). Typically, this test involves filling an aluminum foil tube (2.5 cm diameter, 14 cm height) with bitumen and storing it vertically at 163° C. for 48 h. The softening point (ASTM D36) is measured for the material in the top and bottom thirds of the tube. A softening point difference ΔS <2.2° C. is considered a stable blend.

Chemical diffusion of oxygen, water, and other reactive species through bitumen is a part of aging mechanisms. Computational modelling (e.g., molecular dynamics (MD) simulations) can be used to examine the diffusion of oxygen, water, and hydrogen peroxide through a model bitumen medium or along bitumen interfaces with other materials. Fillers such as clay nanoparticles can slow diffusion in materials by acting as physical barriers, forcing molecules to travel longer paths by traveling around the clay particles. Both mineral and carbonaceous filler materials are typically more polarizable than the surrounding bitumen matrix, so polar reactive molecules may be more strongly attracted to them by Van der Waals interactions. Biochar (or surface-treated biochar) can be more likely than mineral fillers to contain polar groups, since mineral fillers are already fully oxidized. As such, biochar can be more effective than typical mineral fillers at adsorbing polar molecules and reacting with or neutralizing oxygen or peroxides. Computational modeling can provide parameters for biochar antiaging additives for bituminous composites including surface treatment to increase its dosage efficiency.

EXAMPLES

Example 1

This example demonstrates the use of functionalized carbon, referred to as biochar, as a free radical scavenger. The biochar was made from thermochemical liquefaction of a blend of algae and manure. Efficacy of the biochar as a free-radical scavenger and ultraviolet (UV) blocker qualifies it as an anti-aging additive in construction including roofing shingles made from bituminous composite. Results show that the addition of biochar to bitumen reduced aging of bitumen. All tested biochars made from various relative proportions of algae and swine manure were found to be effective at reducing the extent of aging; however, the biochar made from algae alone was the most effective. The latter result could be attributed to the high surface area and rich phenol functional groups in algal biochar, turning it into an effective free-radical scavenger.

Materials and Methods

The neat asphalt was a PG 64-10 graded asphalt (Table 2). The biochar was produced through thermochemical liquefaction of various dosages of algae and swine manure.

TABLE 2

| Properties of PG 64-10 binder | | |
|---|---|---|
| | Test and Temperature | Result |
| Original Binder | Flash Point | 302° C. |
| | Rotational Viscosity @135° C. | 0.402 Pa-s |
| | Dynamic Shear, G*/sinδ @64° C. | 1.173 |
| PAV aged Binder | Dynamic Shear, G*sinδ @ 31° C. | 1182 |
| (aged @100° C.) | Stiffness @ 0° C. | 28 MPa |
| | m-value @ 0° C. | 0.468 |

*Cyanidioschyzon merolae* (*C. merolae* MS1-YNP, or "CM") liquefied by thermochemical liquefaction was used as an example of algal biochar. The microalgae had a moisture content of 70 wt % and an ash content of 1.76 wt %, while the swine manure had a moisture content of 36.21 wt % and an ash content of 35.75 wt %. All the chemicals (dichloromethane, hexane, and acetone) used in the process were commercially purchased from Sigma Aldrich. Hydrothermal liquefaction (HTL) was performed at a temperature of 330° C. with a solid loading of 20 wt %. To perform the test, 10 grams equivalent of dry biomass along with the required amount of distilled water to make 50 mL slurry was loaded into the reactor. The slurry was then heated to the desired temperature with an initial pressure of 9 MPa provided by ultra-high pure (UHP) nitrogen. UHP nitrogen was also used to purge the reactor headspace and create an inert atmosphere. Once the reactor reaches the desired temperature, the residence time of 30 min was left for the reaction to complete. Upon completion, the reactor was cooled to room temperature and depressurized; 25 mL of dichloromethane was added to the reactor. The contents of the reactor were transferred into the filtration unit for separation. The liquefaction yields four major product fractions: biocrude oil, biochar, aqueous fraction (water-soluble compounds), and gaseous fraction.

20 g of asphalt was heated to 135° C. for 30 minutes to liquefy the asphalt. 1 g of biochar prepared as described herein (5% by weight of neat asphalt) is combined with the asphalt to yield a mixture. The mixture was placed on a hotplate at 135° C. and blended with a spatula for 5 minutes to ensure homogenous mixing.

Biochar was added to bitumen at a 5% dosage by weight of the neat asphalt. The neat asphalt (without biochar) was labeled as 0-0; the first number shows the algae concentration and the second number shows the swine manure concentration in the biomass feedstock that was used to produce the biochar (Table 3). The components of algae and swine manure bio-oil were obtained through gas chromatography-mass spectroscopy (Table 4) and thin-layer chromatography with flame ionization detection (Table 5).

TABLE 3

| Acronyms of samples | | |
|---|---|---|
| Sample name | Algae (%) | Swine manure (%) |
| 0-0 | 0 | 0 |
| 0-100 | 0 | 100 |
| 20-80 | 20 | 80 |
| 50-50 | 50 | 50 |
| 80-20 | 80 | 20 |
| 100-0 | 100 | 0 |

TABLE 4

| Molecules of bio-oil (from GC-MS) from which biochar was extracted | |
|---|---|
| Molecules | % Concentration |
| Algae | |
| Heptane, 2,4-dimethyl- | 6.7 |
| Undecane, 3,7-dimethyl- | 6.3 |
| Octane, 4-methyl- | 6.1 |
| Phenol | 5.2 |

TABLE 4-continued

| Molecules of bio-oil (from GC-MS) from which biochar was extracted | |
|---|---|
| Molecules | % Concentration |
| Swine Manure | |
| p-Cresol | 1.5 |
| 4-ethyl- | 1.4 |
| Phenol | 1.1 |
| 4-ethyl-2-methoxy- | 0.6 |

TABLE 5

Solubility-based compounds of bio-oil (through TLC-FID) from which biochar was extracted

| Sample | Saturates | Aromatics | Resins | Asphaltenes |
|---|---|---|---|---|
| 0-100 | 1.93 | 3.06 | 71.24 | 23.76 |
| 20-80 | 0.51 | 2.45 | 8.29 | 88.75 |
| 50-50 | 0.83 | 0.25 | 72.67 | 26.25 |
| 80-20 | 0.00 | 1.31 | 45.09 | 53.60 |
| 100-0 | 0.00 | 15.37 | 83.48 | 1.13 |

Ultraviolet Aging Method. The unaged samples were exposed to UV radiation to provide accelerated aging. To prepare samples, 10 g of the unaged specimen was evenly spread on a steel pan (140 mm diameter) to make a film 0.65 mm thick. The pan was then placed in a UV chamber 10 cm away from the lamp; the lamp had a UV radiation intensity of 0.71 W/m$^2$. UV exposure continued for 200 hr at 65° C. Samples were collected at time intervals of 50 hr, 100 hr, and 200 hr.

Dynamic Shear Rheometer. The elastic and viscous properties of each sample were measured using an Anton Paar Rheometer MCR 302 following ASTMD7175. Tests were conducted using an 8-mm parallel plate spindle at a 0.1% strain rate and frequencies ranging from 0.1 to 100 rad/s at 10° C. Throughout the test, stress and strain were measured, and data were used to calculate the shear modulus (G*) and phase angle (δ) based on Equation 3. The complex shear modulus (G*) is a measure of a material's resistance to deformation when repeatedly sheared, and δ is the time lag between stress and strain. From the data, the modulus and frequency at which the phase angle is 45 degrees were determined as crossover values. (At the crossover point, the elastic modulus (G') and viscous modulus (G") are equal.)

$$G^* = \frac{\tau_{max}}{\gamma_{max}} \tag{3}$$

in which $$\gamma_{max} = \left(\frac{\theta r}{h}\right)$$

and $$\tau_{max} = \frac{2T}{\pi r^3}$$

where:

$\gamma_{max}$=maximum strain $\tau_{max}$=maximum stress

T=maximum applied torque r=radius of the sample

θ=deflection (rotational) angle h=height of the sample

Activation-Energy-Based Aging Index. The activation energy of unaged and UV-aged samples was calculated based on the zero-shear viscosity; the activation energy was then used to develop the activation-energy-based aging index. To measure zero shear viscosity, rheometry was conducted using a shear rate sweep (using an 8-mm parallel plate with a 2 mm gap) at 50, 60, and 70° C. The collected data was used to calculate the activation energy using Equation 4

$$\ln\eta = \ln A + \frac{E_f}{R}\frac{1}{T} \tag{4}$$

where:

η is the viscosity of asphalt in Pa·s $E_f$ is the flow activation energy (KJ·mol$^{-1}$)

R is the universal gas constant (8.314×10-3 KJ·mol$^{-1}$·K$^{-1}$)

T is the temperature

A is constant.

Fourier Transform Infrared (FTIR) Spectroscopy. A Bruker FTIR spectrometer was used to characterize the functional groups of unaged samples and samples subjected to different UV aging levels. Before starting the test, the FTIR diamond crystal surface was cleaned with isopropanol. The background spectrum was collected and subtracted from the sample spectra. Each FTIR spectrum was collected from 400 to 4000 cm$^{-1}$ wavenumbers with a resolution of 4 cm$^{-1}$ with 32 scans. To analyze the peaks and calculate the area under each peak, OMNIC software was used.

Results and Discussion

Figure 1B:
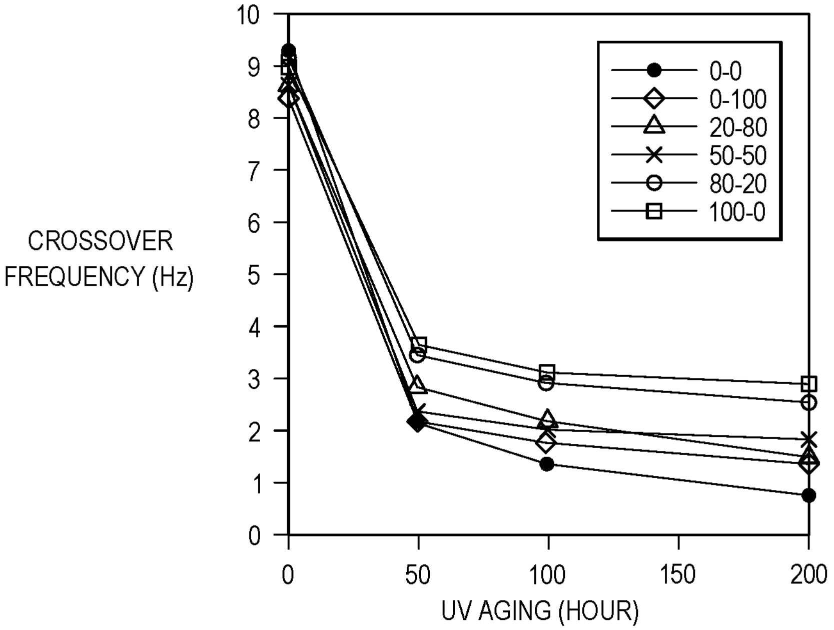

Crossover-Modulus-Based Aging Index. The crossover-modulus-based aging index was calculated for samples aged from 0 to 200 hours under UV exposure. FIG. 1A shows that before aging, all samples show approximately the same value for crossover modulus. The crossover modulus shows a sharp decrease after 50 hours of UV aging, and it continues to decrease at a slower rate through 200 hours of UV aging. As shown in FIG. 1B, crossover frequency has the same trend. As shown in FIGS. 1A and 1B, asphalt without biochar (0-0) showed the highest change in modulus throughout UV aging. Asphalt samples with biochar showed a lower change in properties compared to the asphalt without biochar, indicating improved resistance to aging due to the addition of biochar. The highest resistance to UV aging (the lowest aging index) was found for the asphalt having biochar made from algae alone (the sample referred to as 100-0, algae-manure ratio). The data was used to calculate the aging index using Equation 5 for each scenario (Table 6). As shown in Table 6, the asphalt without biochar has the highest aging index of 28% after 50 hr and 45% after 200 hr. All samples having biochar showed aging index values lower than neat asphalt, with algal biochar (100-0 scenario) showing the lowest aging index of 17% after 50 hr and 25% after 200 hr of aging. This indicates that a 45% improvement in aging resistance through 200 hours of aging can be achieved by introducing algal biochar.

$$\text{Rheological Aging Index} = \frac{\text{unaged crossover modulus} - \text{aged crossover modulus}}{\text{unaged crossover modulus}} \times 100 \quad (5)$$

TABLE 6

| Crossover-modulus-based rheological aging index | | | | | | |
|---|---|---|---|---|---|---|
| | 0-0 | 0-100 | 20-80 | 50-50 | 80-20 | 100-0 |
| Aging Index % for 0-50 hr | 28.17 | 18.92 | 19.03 | 20.84 | 21.87 | 17.45 |
| Total Aging Index % for 0-200 hr | 44.96 | 31.09 | 34.31 | 32.85 | 29.93 | 24.75 |

Figure 2A:
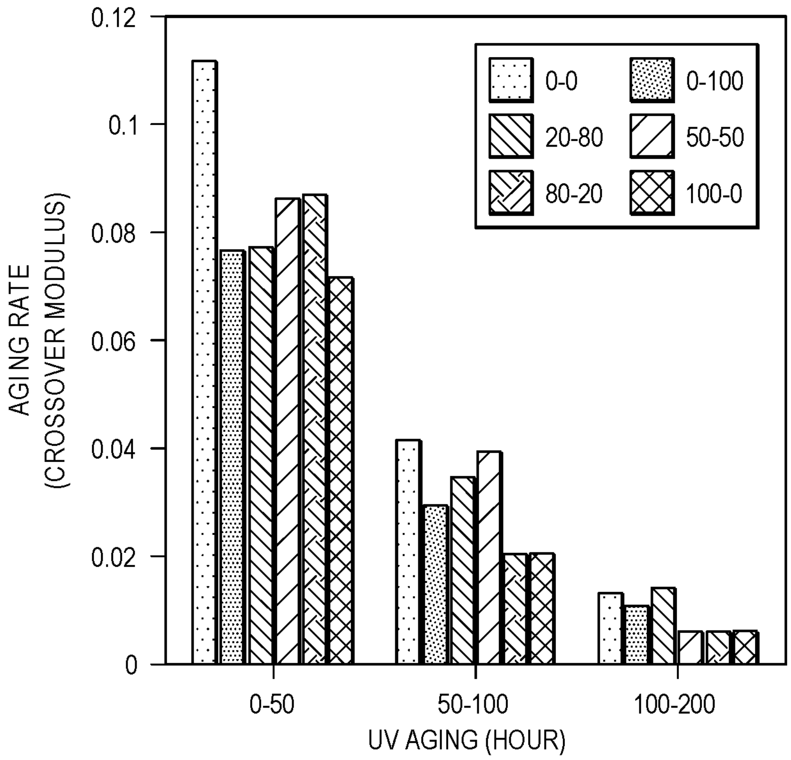
FIGS. 2A and 2B show aging rate calculated based on the slope of crossover modulus and crossover frequency, respectively, as a function of aging time.
Figure 2B:
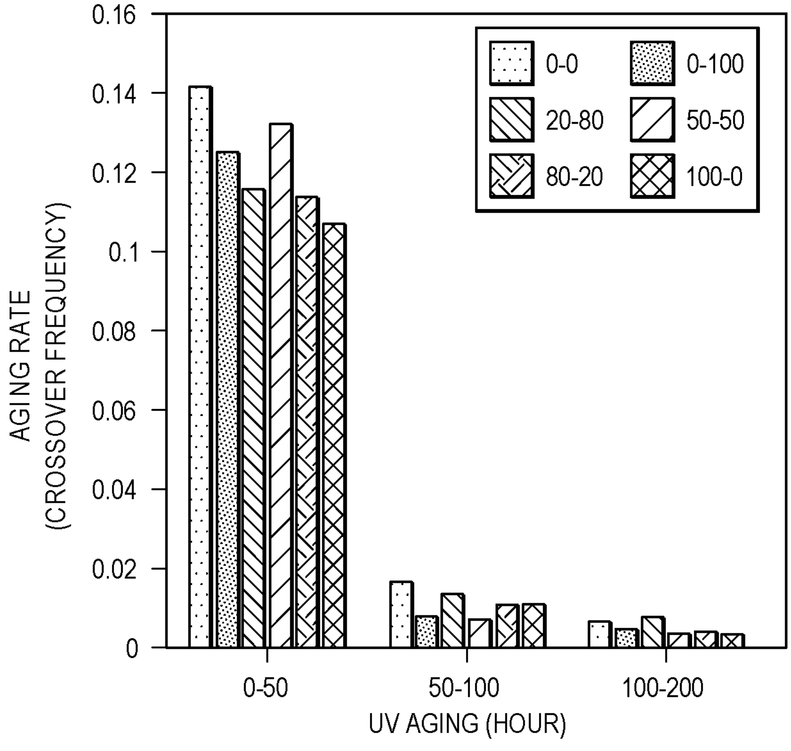

To further evaluate the aging rate for each aging interval (0 to 50 hours, 50 to 100 hours, and 100 to 200 hours), the change of the crossover modulus and crossover frequency during the aging interval was determined using the slope of the plot at each aging interval. As shown in FIGS. 2A and 2B, the aging rate of asphalt without biochar was found to be higher than all the asphalt samples having biochar. Asphalt samples having biochar performed differently depending on the type of biochar. The lowest aging rate (highest resistance to UV aging) was found for biochar made from algae alone (the 100-0 sample).

Figure 3:
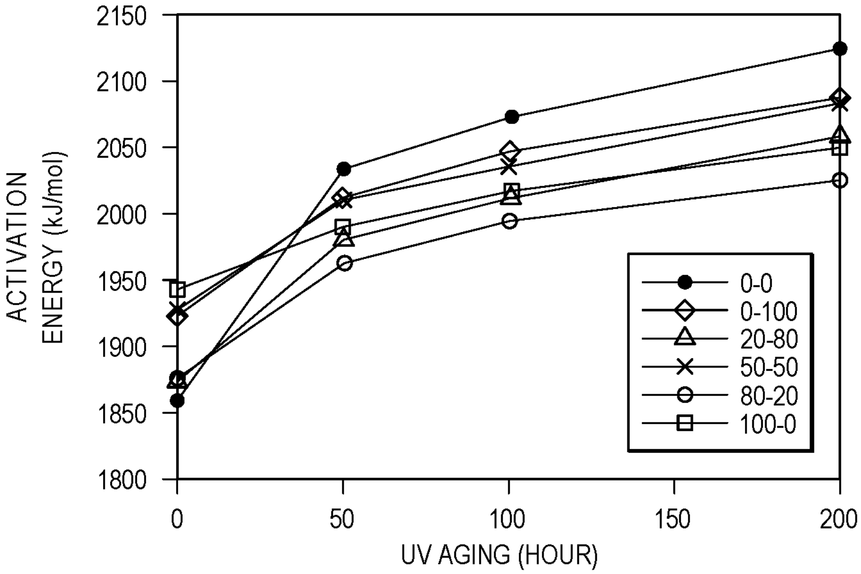
FIG. 3 shows activation energy for asphalt with and without biochar as a function of ultraviolet (UV) aging.

Activation-Energy-Based Aging Index. FIG. 3 shows the activation energy plot for all samples after UV aging of 0 to 200 hours. As shown in FIG. 3, the presence of biochar increased the activation energy as expected, since the asphalt became stiffer overall when biochar was present. However, to study the aging effect, the change of properties during each aging period was monitored. The data was used to calculate the activation energy-based aging index using Equation 6 for each scenario (Table 7). Neat asphalt had an increase in activation energy of 9% after 50 hr and 14% after 200 hr (Table 7). Among asphalt samples that contained biochar, the algal biochar had the lowest increase in activation energy of 2.48% after 50 hr and 5.56% after 200 hr. The 5.56% increase after 200 h represents a 61% reduction compared to the 14.36% increase for asphalt without biochar after 200 hr aging.

$$\text{Activation Energy-Based Aging Index} = \frac{\text{aged activation energy} - \text{unaged activation energy}}{\text{unaged activation energy}} \times 100 \quad (6)$$

TABLE 7

| Activation-energy-based aging index | | | | | | |
|---|---|---|---|---|---|---|
| | 0-0 | 0-100 | 20-80 | 50-50 | 80-20 | 100-0 |
| Aging Index % for 0-50 hr | 9.49 | 4.63 | 5.70 | 4.38 | 4.69 | 2.48 |
| Total Aging index % for 0-200 hr | 14.36 | 8.54 | 9.95 | 8.26 | 8.08 | 5.56 |

Figure 4:
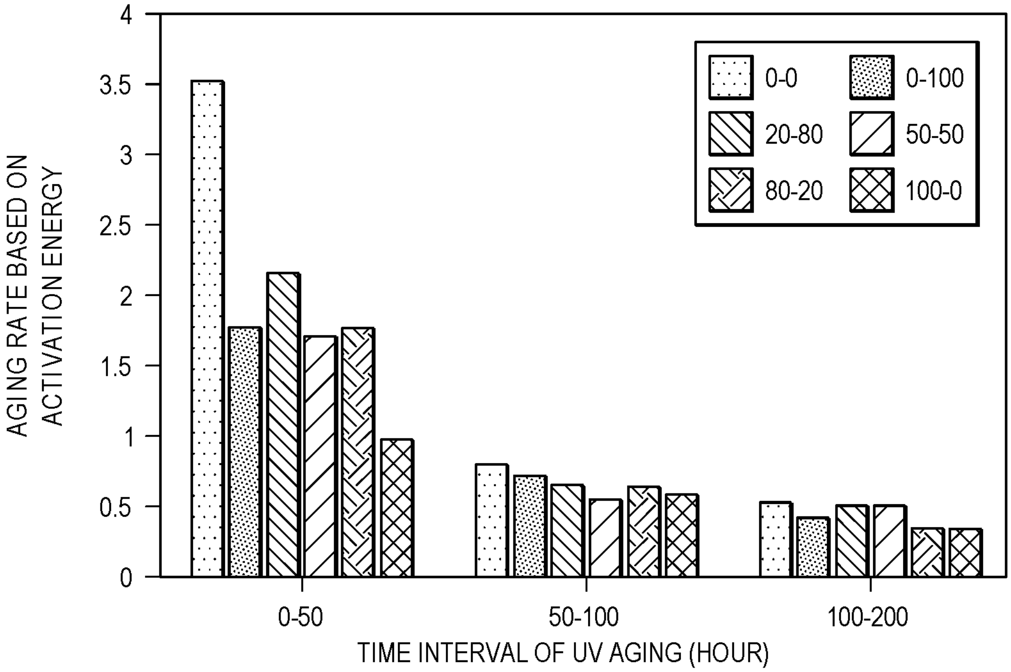
FIG. 4 shows activation energy-based aging rate for asphalt with and without biochar.

To evaluate the aging resistance of biochar, the aging rate was defined as the slope of each segment (0 to 50 hr, 50 to 100 hr, and 100 to 200 hr); these slopes are plotted in FIG. 4. As shown in FIG. 4, the aging rate was the highest for the 0-0 sample, and all samples with added biochar showed a lower aging rate compared to the neat sample. FIG. 4 also shows that the highest aging rate occurs during the first 50 hr of aging, and the rate of change in activation energy slows during the subsequent intervals.

Chemical Aging Index. FTIR spectroscopy was used to track the extent of change in the chemical structure of asphalt during aging. To quantify the change, Equation 7 and Equation 8 were used to calculate the carboxyl functional groups and sulfoxide functional groups, respectively, of all samples.

Figure 5A:
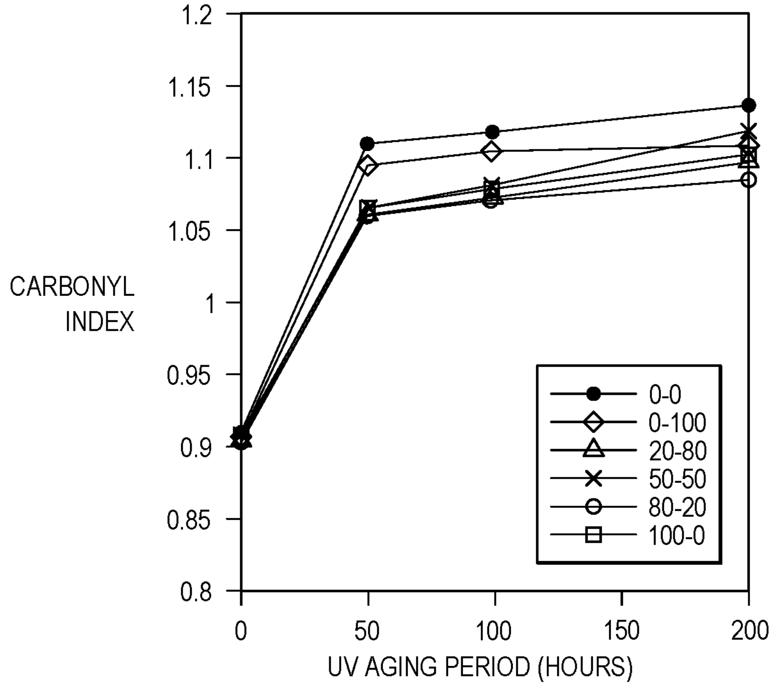
FIGS. 5A and 5B show carbonyl index values and sulfoxide index values, respectively, for samples exposed to UV aging.
Figure 5B:
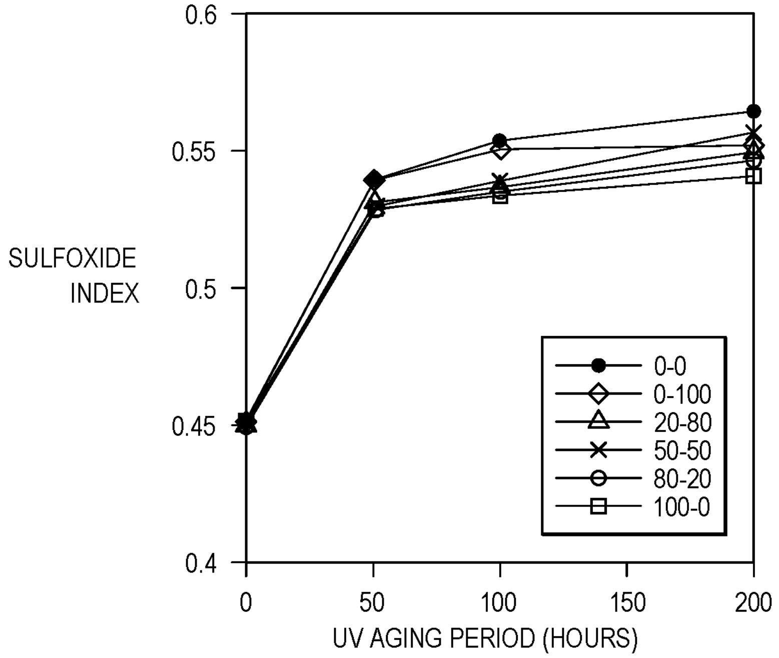

The carbonyl and sulfoxide index results for specimens exposed to UV aging are shown in FIGS. 5A and 5B, respectively.

$$\text{Carbonyl Index} = \frac{\text{Area under curve from } 1680\text{–}1800\ \text{cm}^{-1}}{\text{Area under curve from } 600\text{–}4000\ \text{cm}^{-1}} \times 1000 \quad (7)$$

$$\text{Sulfoxide Index} = \frac{\text{Area under curve from } 960\text{–}1050\ \text{cm}^{-1}}{\text{Area under curve from } 600\text{–}4000\ \text{cm}^{-1}} \times 1000 \quad (8)$$

Figure 6:
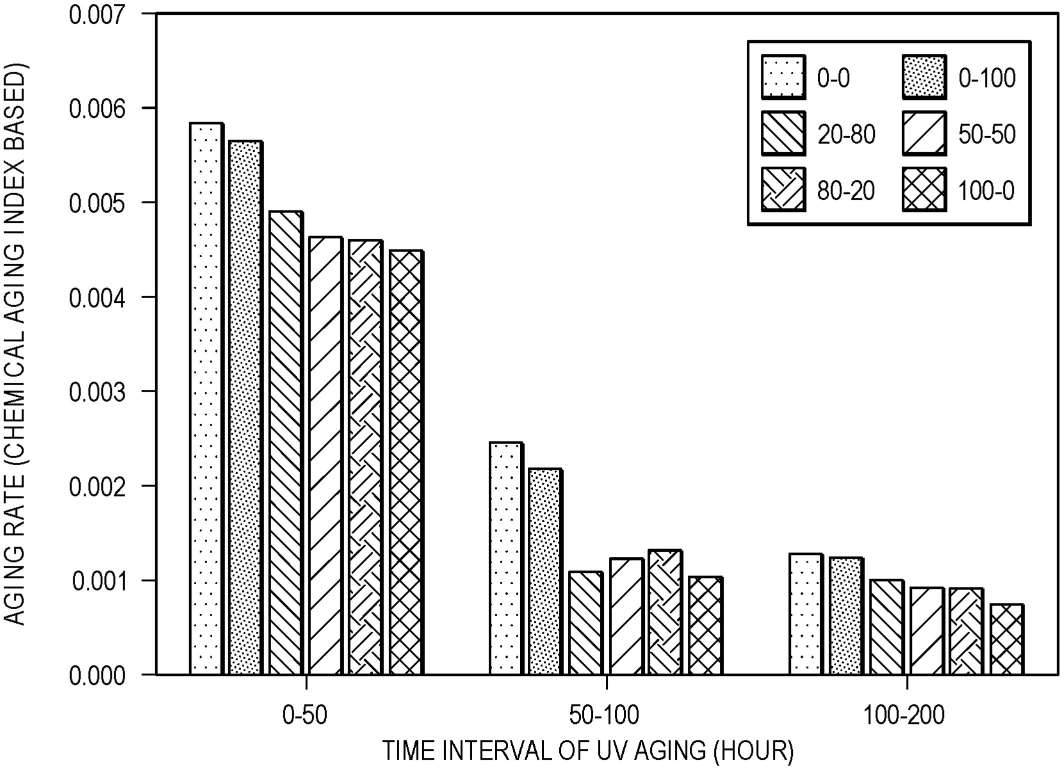
FIG. 6 shows the Chemical Aging Index (CAI) based aging rate based on the slope of the CAI during each time interval.

As shown in FIGS. 5A and 5B, respectively, all samples had similar values for the Carbonyl Index and Sulfoxide Index before aging, since the presence of biochar did not contribute to either of the above indexes before aging. When asphalt samples were exposed to UV aging, their Carbonyl Index and Sulfoxide Index increased, with the largest increase happening in the first 50 hr. Asphalt samples without biochar showed a higher increasing rate than asphalt samples with biochar. To facilitate comparing studied scenarios, the sum of the two indexes was calculated at each aging interval and referred to as the Chemical Aging Index (CAI), following methods generally known in the art. The asphalt sample without biochar showed a CAI of 22% after 50 hr and 40% after 200 hr of aging (Table 8). Among all asphalt samples with biochar, the sample containing algal biochar (100-0 scenario) had the lowest CAI value of 17% after 50 hr and 26% after 200 hr of aging. This represents a 36% improvement in the aging resistance of asphalt due to the addition of algal biochar. FIG. 6 shows the aging rate based on changes in the chemical aging index over time.

TABLE 8

| Chemical Aging Index (CAI) (%). CAI = Carbonyl index + Sulfoxide index | | | | | | |
|---|---|---|---|---|---|---|
| | 0-0 | 0-100 | 20-80 | 50-50 | 80-20 | 100-0 |
| CAI (%) for 0-50 hr | 21.75 | 21.11 | 18.29 | 17.17 | 17.08 | 16.69 |
| CAI (%) for total 0-200 hr | 40.36 | 38.62 | 29.82 | 28.34 | 28.61 | 25.91 |

As shown in FIG. 6, the CAI-based aging rate was consistently lower for asphalt samples with biochar compared to those without biochar.

Finally, all the aging indexes calculated for different aging levels for the sample with no biochar and the sample with algal biochar (100-0) are summarized in Table 9.

TABLE 9

| Summary of calculated aging indexes after 200 hr of UV aging | Rheology Aging Index | Activation-Energy-based Aging Index | Chemical Aging Index |
|---|---|---|---|
| No Biochar (0-0) | 44.96 | 14.36 | 40.36 |
| Algal Biochar (100-0) | 24.75 | 5.56 | 25.91 |
| % Improvement | 45 | 61 | 36 |

Conclusion. The efficacy of several biochars made from various ratios of algae and swine manure as anti-aging additives to delay asphalt aging was demonstrated. The extent of aging was tracked based on changes in the physicochemical properties of asphalt samples containing 5% of each biochar. The physicochemical properties were measured using rheological measurements, chemical fingerprints, and activation energy of each sample to determine the aging index. The aging index was quantified at several intervals during 200 hr of ultraviolet radiation. All indexes showed that asphalt samples containing biochar had lower aging levels compared to samples without biochar, indicating that the presence of biochar delays UV aging. This was attributed to the capability of biochar as a free-radical scavenger and UV blocker. Among asphalt samples with biochar, the one with algal biochar showed the highest resistance to UV aging. This was attributed to algal biochar's having the highest content of phenolic structures, contributing to its role as a radical scavenger. The results showed that with the addition of algal biochar, the improvement in aging indexes after 200 hr of UV aging was 45% for the rheological aging index, 61% for the activation-energy-based aging index, and 36% for the chemical aging index.

Example 2

Laboratory experiments and molecular dynamics simulations were conducted to compare the efficacy of pristine carbon and functionalized carbon in delaying the aging of bituminous composites. The delay in aging was measured based on changes in the chemical and rheological properties of modified bitumen samples exposed to UV aging. The underlying molecular mechanisms that delay aging were investigated by computing the extent of diffusion of free radicals through an amorphous graphite film in pristine and functionalized forms. The laboratory results indicate that functionalized carbon obtained from biowaste is more effective than pristine carbon at delaying aging. The simulation results corroborate laboratory findings showing that even at low concentrations, surface functional groups such as amines and amides considerably enhance the efficacy of pristine carbon in shielding the underlaying layers against the diffusion of free radicals such as hydrogen peroxide ($H_2O_2$). At high concentrations (e.g., 10 wt %), amines were found to be more effective than amides at reducing the diffusion rate of $H_2O_2$. This indicates that the scavenging efficacy of carbonaceous particles can be optimized by selected bio-grafting.

Materials and Methods

Materials. The unaged neat bitumen was a PG 64-10 graded bitumen (Table 10). The carbonaceous particles were produced via hydrothermal liquefaction of biomass waste (algae). Hydrothermal liquefaction (HTL) was performed at 330° C. in a 250-ml stainless steel benchtop batch reactor (Parr Instrument Company, Moline, IL) equipped with a magnetic stirrer, a 4843 controller, and a jacketed heater. The working volume of the system was set to a maximum of 125 ml. The biochar was produced at 20% solid loading (25 g dry weight) in all the HTL experiments. The algal biochar that was produced served as functionalized carbon (FC). In contrast, the pristine carbon (PC) was produced from woody biomass (wood-based biochar). The samples were prepared by introducing anti-aging agents (biochar) at 5 wt % to the unaged neat bitumen; the two were then blended using a shear mixer at 135° C. for five minutes. The blended samples were labeled Neat Binder (NB), Functionalized Carbon-modified Binder (FCB), and Pristine Carbon-modified Binder (PCB).

TABLE 10

Properties of the PG 64-10 binder

| | Test and Temperature | Result |
|---|---|---|
| Original Binder | Flash Point | 302° C. |
| | Rotational Viscosity @135° C. | 0.402 Pa · s |
| | Dynamic Shear Rheometer, G*/sinδ @ 64° C. | 1.173 kPa |
| Aged Binder (aged @100° C.) | Dynamic Shear Rheometer, G*sinδ @ 31° C. | 1182 kPa |
| | Stiffness @ 0° C. | 28 MPa |
| | m-value @ 0° C. | 0.468 |

Ultraviolet (UV) aging. The unaged samples were exposed to UV radiation to accelerate aging. A QUV Accelerated Weathering Tester manufactured by the Q-Lab Corporation (Westlake, Ohio, USA) was used to perform the UV aging of the samples. To prepare samples, 10 g of the unaged specimen (NB, FCB, or PCB) was evenly spread on a steel pan 140 mm in diameter, to make a 0.65-mm film. The pan was then placed in the chamber of a UV accelerator 100 mm from the lamp; the lamp used in the UV accelerator had a UV radiation intensity of 0.71 $W/m^2$ at 313 nm wavelength. UV exposure continued for 200 hr at 65° C.

Dynamic shear rheometer (DSR). The elastic and viscous properties of each sample were measured using an Anton Paar Rheometer MCR 302 following (ASTMD7175-15, 2015). The tests were carried out using an 8-mm parallel-plate spindle at a 0.1% strain rate and frequencies ranging from 0.1 to 100 rad/s at 10° C. The measured stress and strain data were used to calculate the shear modulus (G*) and phase angle (δ) based on Equation 7. From the data, the modulus and frequency at which the phase angle was 45 degrees were determined as crossover values. At the crossover point, the elastic modulus (G') and viscous modulus (G") are equal. Considering that progressive aging leads to significant changes in polydispersity as asphaltene molecules form nanoaggregates, crossover values are deemed appropriate to track the evolution of bitumen not only during aging but also during rejuvenation. Provided that the crossover frequency and corresponding crossover moduli are measured at the same temperature for all bitumen specimens in comparison, the crossover values can properly detect and compare the extent of the delay in aging as calculated by Equation 3.

Rheological aging index. The rheological aging index was calculated based on the change in the crossover modulus which has been shown to be quite sensitive to aging. The rheological aging index for each scenario was calculated by Equation 5.

Fourier transform infrared (FTIR) spectroscopy. A Bruker FTIR spectrometer (Manufactured by Bruker Corporation) was used to characterize the functional groups of unaged samples and samples subjected to different UV aging levels. Before starting the test, the FTIR diamond crystal surface was cleaned with isopropanol. The background spectrum was collected and subtracted from the sample spectra. Each FTIR spectrum was collected from 400 to 4000 $cm^{-1}$ wavenumbers with a resolution of 4 $cm^{-1}$ with 32 scans. To analyze the peaks and calculate the area under each peak, OMNIC software version 9.2.86 was used.

Chemical aging index. Fourier-transform infrared (FTIR) spectroscopy was used to track the extent of the change in the chemical structure of bitumen during aging. To quantify the change, Equations 7 and 8 were used to calculate the carboxyl functional groups and sulfoxide functional groups, respectively, of all samples. The chemical index and chemical aging index, respectively, were calculated using Equations 9 and 10.

$$\text{Chemical Index} = \text{Carbonyl Index} + \text{Sulfoxide Index} \tag{9}$$

$$\text{Chemical Aging Index} = \frac{\text{Aged chemical index} - \text{Unaged chemical index}}{\text{Unaged chemical index}} \times 100 \tag{10}$$

Molecular dynamics simulations. To study the efficacy of amide and amine functional groups at protecting biochar against the diffusion of hydrogen peroxide ($H_2O_2$), molecular dynamics simulations were carried out using nonadecanamide ($C_{19}H_{39}NO$) and ethylenediamine ($C_2H_8N_2$) as representatives of amide and amine functional groups. Biochar was modeled as an amorphous graphite film. The following steps were taken to construct the film: 1) a stack of five graphene sheets of dimensions 5 nm×5 nm with an interlayer spacing of 0.335 nm was placed in the simulation box; 2) the temperature was increased at a constant volume from 300 K to 6,000 K using the Nose-Hoover (NH) thermostat over 50 ps; 3) the temperature was maintained at 6,000 K for another 50 ps to allow for the formation of an amorphous structure; 4) the structure was quenched by lowering the temperature back to 300 K over 0.5 ps, preventing the sheets from restoring their initial configuration; and 5) the temperature was kept at 300 K at constant zero pressure using the NH thermostat for 20 ps to achieve the final structure. A time step of 1 fs was used, and the reactive force-field (ReaxFF) potential was used to represent interatomic interactions.

The diffusion of $H_2O_2$ into the constructed biochar film in both pristine and functionalized forms was simulated, and the number of $H_2O_2$ molecules having passed the film at a given time was used to compare different cases. The simulation of $H_2O_2$ diffusion through pristine biochar involved the following steps: 1) a reservoir of 300 $H_2O_2$ molecules was positioned at a minimum distance of 4 Å above the biochar film, 2) the temperature was set at 300 K using the Langevin algorithm, and 3) the biochar film and $H_2O_2$ molecules were allowed to interact with one another for 20 ns under the microcanonical (NVE) ensemble. The Tersoff potential was used to describe the interatomic interactions among carbon atoms in the biochar film, and those among hydrogen and oxygen atoms in $H_2O_2$ were defined by the Consistent Valence Forcefield (CVFF). The Lennard-Jones (LJ) potential was used to describe nonbonded interactions among the biochar and $H_2O_2$ constituents.

Biochar films functionalized with different weight concentrations of ethylenediamine and nonadecanamide were also simulated. The Amber force field was used to define interactions within and among ethylenediamine, and those of nonadecanamide were defined with CVFF. Four concentrations were examined: 1.2 wt %, 2.1 wt %, 5.6 wt %, and 10 wt %, corresponding to 5, 9, 25, and 48 ethylenediamine molecules and 1, 2, 5, and 9 nonadecanamide molecules. The simulations ran for 20 ns, and the number of $H_2O_2$ molecules having passed the film was counted.

Results and Discussion

Figure 7:
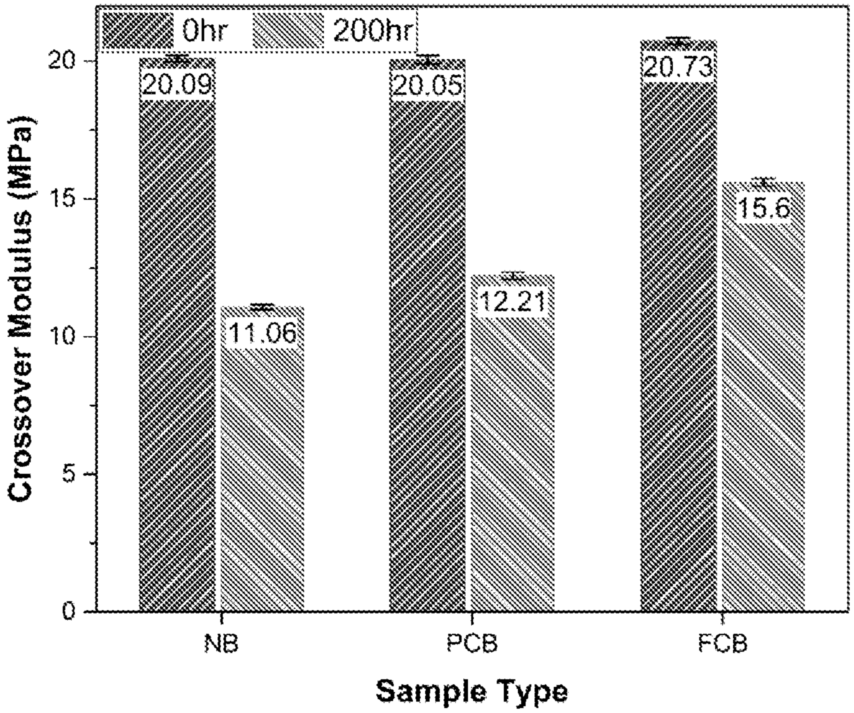
FIG. 7 shows crossover modulus for all samples subjected to 0 hr and 200 hr UV aging.

Laboratory experiment results. FIG. 7 shows the crossover modulus measured for all samples subjected to 0 hr and 200 hr UV aging, based on a dynamic shear rheometer. At the unaged stage, all samples showed approximately the same crossover modulus value. This indicated the biochar (functionalized carbon and pristine carbon) did not have a significant impact on the stiffness of neat bitumen. However, after 200 hr of UV aging, the corresponding crossover modulus values found to be considerably different among the studies scenarios.

Comparison of the rheological aging indices of the samples (Table 11) shows that biochar (both functionalized carbon and pristine carbon) reduced the rheological aging index of the neat bitumen. However, the functionalized carbon was more effective at reducing the rheological aging index (45% vs 13%).

TABLE 11

Rheological aging index for all samples

| | NB | PCB | FCB |
|---|---|---|---|
| Rheological Aging Index | 45 | 39 | 25 |
| % Improvement | — | 13 | 45 |

Figure 8:
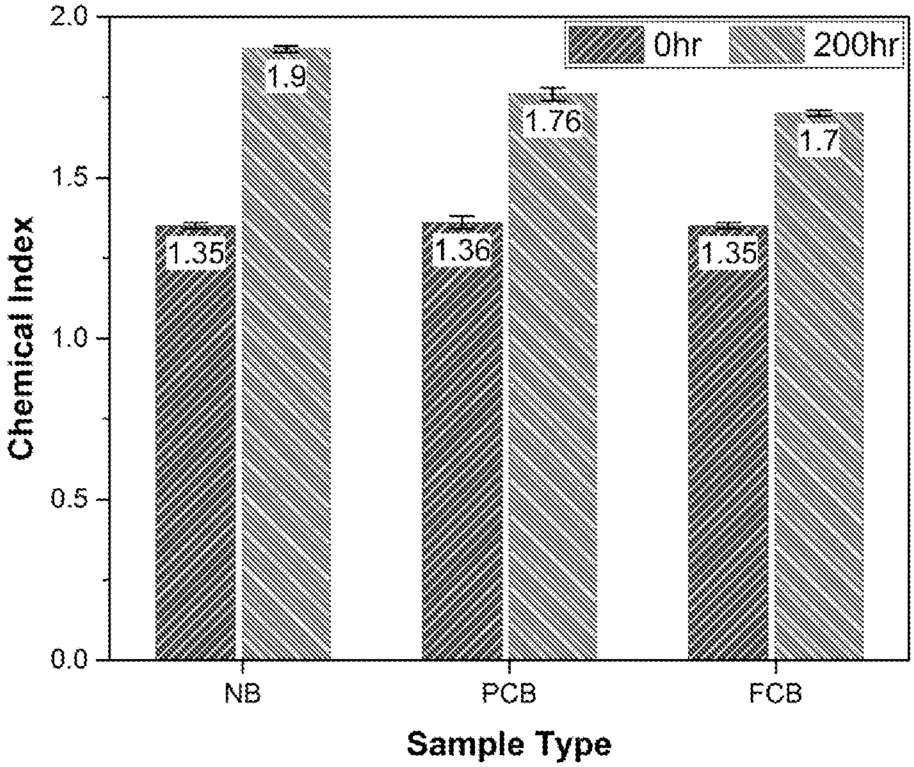
FIG. 8 shows the chemical aging for all samples subjected to 0 hr and 200 hr UV aging.

FIG. 8 shows that the chemical aging of all the tested samples increased after 200 hr of UV aging; the neat bitumen showed the highest increase, followed by PCB and FCB. Comparison of the chemical aging indices calculated based on these data shows that both functionalized and pristine carbons delayed the UV aging of the neat bitumen, but the functionalized carbon was more effective.

TABLE 12

Chemical aging index for all samples

| | NB | PCB | FCB |
|---|---|---|---|
| Chemical Aging Index | 40 | 29 | 26 |
| % Improvement | — | 28 | 35 |

Molecular dynamics simulation results. Ethylenediamine and nonadecanamide were found to be effective at protecting the biochar film against the diffusion of $H_2O_2$ and exhibited comparable efficacies at concentrations below about 5.6 wt %. However, while the efficacy of nonadecanamide peaked at this concentration, that of ethylenediamine continued to almost linearly increase over the entire concentration range studied. At a concentration of 10 wt %, for instance, ethylenediamine reduced the number of passed $H_2O_{2S}$ by 34% (from 237 to 157) showing 12% more effectiveness than nonadecanamide (from 237 to 186).

Conclusion. Laboratory experiments and molecular dynamics simulations showed that the grafting of bio-derived molecules can be tailored to maximize their scavenging capacity, as evidenced by the decreased diffusion of free radicals through bio-grafted carbon particles. It was also shown that the application of functionalized carbon-modified binders remarkably delayed the aging of bituminous composites. While pristine carbon improved the rheology-based and chemistry-based aging indices of bituminous composites by 13% and 28%, respectively, the samples containing functionalized carbon exhibited much higher improvement of 45% and 35% in the respective indices. These observations were corroborated by molecular dynamics simulations showing the increased barrier efficiency of bio-grafted carbon against free radicals. The amine and amide functionals used in the simulations exhibited comparable efficacies in preventing the diffusion of $H_2O_2$ at low modifier concentrations. At high concentrations, however, the amine functionals proved to be more effective than amide functionals, indicating the scavenging capacity of bio-grafted carbon can be further tuned using optimized grafting.

Example 3

This example describes the use of functionalized carbon derived from an algal feedstock to selectively remove some hazardous bitumen emissions, alleviating the side effects of intense sun exposure and high temperatures on air quality. Density functional theory is used to model six organic compounds emitted from bitumen that are precursors to secondary organic aerosols, and their adsorption to the active zones of a model surface of an algal biochar containing N-functional groups of amide, amine, pyrrole, and pyridine is measured. Maximum average adsorption energy toward the nitrogen-rich surface of biochar was shown by benzoic acid and dibenzothiophene (ΔE=−18.1 kcal/mol), and benzofuran showed the minimum (ΔE=−8.3 kcal/mol). All interactions were performed under non-bonding physical interactions, including H-bonding, dipole-dipole, and dispersion forces. The size of the difference between the maximum and minimum average adsorption energies suggests that functionalized carbon acts as a solid sorbent to adsorb hazardous bitumen emissions.

Apart from the role of O-containing functional groups such as phenols, alcohols, ketones, lactones, and carboxylic acids that are normally abundant in biochars, the role of N-containing functionals in algae biochar cannot be overlooked. The O-containing functional groups and N-containing functional groups have been shown to be the factors most influencing the acidity or basicity of the carbon's surface. The N-containing functional groups mainly demonstrate the basic characteristic.

One difference between algae biomass and terrestrial biomass is the higher protein content of algae biomass. The hydrolysis of protein produces amino acids (containing a $-NH_2$ group) and carboxylic acids (containing a —COOH group), so deamination and decarboxylation are considered to be the main pathways for the decomposition of amino acids. The nitrogen compounds of biochar are not limited to high-protein biomasses such as algae. The dominant nitrogen form in algae is protein-N, which has a lower thermal stability.

A functionalized carbon derived from the hydrothermal liquefaction of an algal biomass is used to demonstrate the efficacy of this carbon in the adsorption of a series of chemical air pollutants (precursors of secondary organic aerosols in the atmosphere) emitted normally from bitumen at elevated temperatures. Using quantum-based computational modeling performed in the framework of density functional theory, the molecular interactions of six of bitumen's emitted chemicals with the targeted active sites of the algal biochar were calculated. The adsorbate molecules consist of O-containing compounds (benzoic acid, benzofuran, and hexanal) and S-containing compounds (dibenzothiophene, 3-pentylthiophene, and hexanethiol). In a comparative study, the average adsorption energy of each gas on the biochar surface is used to estimate the adsorption strength for each gas. Laboratory experiments were performed using dynamic vapor sorption analysis under vacuum to measure the extent of adsorption of select gases by functionalized carbon.

Materials and Methods

Materials. Neat bitumen graded as PG 64-16 and supplied by HollyFrontier Corporation in Arizona (Table 13). The functionalized carbon was made from thermochemical conversion of algae (*Cyanidioschyzon merolae*). Adsorbents used for measurements were 2,3-benzofuran (99%, Sigma Aldrich), dibenzothiophene (analytical standard, Supelco) and benzoic acid (99.5%, Sigma Aldrich).

TABLE 13

| Properties of PG 64-16 Bitumen | |
|---|---|
| Specific Gravity @15.6° C. | 1.025 |
| Flashpoint ° C. | 300 |
| Absolute Viscosity, P @60° C. | 2,005 |
| G*/sinδ, kPa @64° C. | 1.23 |
| Mass change after RTFO | −0.210% |
| G*/sinδ, kPa @64° C. | 3.33 |
| G*sinδ, kPa @28° C. | 2.87 |
| Stiffness (MPa) @ 60 s, @−6° C. | 90.4 |
| m-value @ 60 s, @−6° C. | 0.384 |

Dynamic Vapor Sorption Method. The adsorption/desorption properties of functionalized carbon were measured by an automated vacuum vapor/gas gravimetric sorption analyzer (DVS Vacuum) from Surface Measurement Systems Ltd. During the test, the weight of the sample was measured directly and continuously using the SMS UltraBalance with a resolution of 0.1 μg throughout the experiment. A set partial pressure of solvent was introduced under vacuum using a mass flow controller connected to a flask filled with solvent, whereby saturated vapor pressure of solvent at the desired temperature was generated. The pressure control inside the vacuum chamber was done via a closed-loop PID control between the butterfly valve, pressure transducers, and mass flow controllers. The sorption measurements were done in a mass equilibrium mode, in which the mass equilibrium criteria were set as a change in mass per minute (dmdt). The control software automatically calculates and checks the dmdt criteria against the set dmdt value. When the sample's mass reaches equilibrium at a certain partial pressure of sorbate molecules within the set dmdt tolerance, the control software makes the test proceed to the next partial-pressure step.

DFT-Based Computational Methodology. Designing the model of the biochar surface is the first step in tracking the molecular interactions between the biochar surface (adsorbent) and our target gaseous molecules (adsorbates). The term "surface of alga biochar" is used for the solid sorbent related to the alga. However, this sorbent could be a macromolecule rather than a surface of a crystal. A typical biochar is dependent on its initial precursor (biomass), so a molecular model of a typical biochar is commonly designed based on the biochar's empirical formula and FTIR results. In contrast to graphene with its apparent crystalline properties, it is not easy to detect aromatic clusters in biochars derived at high temperature. In this example, the XRD peaks at 26.426° and 43.019° (2θ) indicated the presence of graphite-like carbon in the algae biochar derived by hydrothermal liquefaction. In addition, at the temperature range (300-350° C.) used in the production of biochar, the presence of randomly oriented polyaromatic clusters is expected. This is supported by the findings that the char prepared at the temperature range of 280-350° C. contained small polyaromatic rings connected through polyphosphate bridges.

The characteristics of the functional groups surrounding the central aromatic zone of the biochar model molecule are determined based on the analytical and spectroscopic studies performed on target alga. The FTIR adsorption peaks indicate the presence of alcoholic OHs and other O-containing functional groups such as phenols, carboxyl, carbonyl, and ketene. The presence of N-containing compounds in the algal biochar is evidenced by the bands at 2100-2270 $cm^{-1}$ corresponding to diimides and azides, and at 1600-1670 $cm^{-1}$ corresponding to N—H stretching of cyclic amides.

The biochar model molecule contains four N-functional groups: amide, amine, pyrrole, and pyridine. Since the focus is on the interactions of specific parts of the biochar char surface, not the entire surface, the central aromatic zone of the biochar model molecule is designed just for connecting the four targeted zones. The four active zones containing N-functional groups are: amide zone, amine zone, pyrrole zone, and pyridine zone. To simulate the chemical environment near the targeted N-functional groups (amide, amine, pyrrole, and pyridine), a part of the aromatic zone coordinated to that N-functional group was considered as the targeted zone. Each biochar zone was optimized to its minimum energy before introducing the gas molecules for interaction.

All energy optimizations on the four biochar sections, the gas adsorbate molecules, and their corresponding adsorption complexes were performed via $DMol^3$ module implemented in the Accelrys Materials Studio program package (version 6.0). The PBE (Perdew-Burke-Ernzerhof) formulation of generalized gradient approximation (GGA) was used as the functional for all calculations. Due to the large polarizability of the algal biochar surface, the long-range van der Waals interactions needed to be included in the calculations to accurately estimate the thermodynamic stability and strength of adsorbent-adsorbate interactions. Grimme's long-range dispersion correction (PBE-D) was used as implemented in the $DMol^3$ module of the Accelrys Materials Studio program package. All-electron double numerical basis sets augmented by polarization functions (DNP) was defined for the optimization process. "Fine" grid was specified for the matrix numerical integrations. At this level of integration, the tolerances for energy, maximum force, and displacement convergence were $1.0\times10^{-5}$ Hartree, $2.0\times10^{-3}$ Hartree/A, and $5.0\times10^{-3}$ Å, respectively.

During the adsorption of gas molecules on each part of the biochar surface, the thermodynamic stability of the adsorption complex formed was expressed through the adsorption energy ($E_{ads}$). $E_{ads}$ is the energy difference between the adsorption complex formed and its constituents when they are in their lowest energy state, as shown in Equation 11.

$$E_{ads} = E_{complex} - (E_{gas\ molecule} + E_{biochar\ zone}) \quad (11)$$

Results and Discussion

The impact of functionalized carbon made from algal biomass on the delay in aging of bituminous composites is believed to be due at least in part to a delayed loss of volatile and oxygenated compounds of bitumen in the form of emissions. Among those volatiles are benzofuran, dibenzothiophene, and benzoic acid. To evaluate the capability of functionalized carbon to retain these gases, a dynamic sorption method was employed, using the above three gases referred to as adsorbents. To prepare samples, functionalized carbon was preheated to 50° C. and held at this temperature under vacuum (<$1\times10^5$ Torr) for 300 minutes, to ensure that residual species were removed from the sample pores. Then the sample was slowly cooled under vacuum to the desired temperature for isotherm measurements, and the above-mentioned adsorbents were introduced for measurement. The adsorption/desorption kinetics for benzofuran as well as total adsorption uptake versus partial pressure were assessed. Measurement of other adsorbents followed the same procedure; the results for all three adsorbents are summarized in Table 14. It was found that functionalized carbon was able to retain the adsorbents; the adsorption of benzofuran was the highest among the three, followed by benzoic acid and dibenzothiophene. Regardless of the variation in the extent of adsorption, the fact that functionalized carbon could retain these volatile compounds that would otherwise be emitted from bitumen can explain part of the delayed progress of aging. The molecular modelling used to quantify the binding energy between the typical volatile compounds emitted from bitumen and the functionalized carbon is described below.

TABLE 14

Adsorption capacity of functionalized carbon for benzofuran, dibenzothiophene, and benzoic acid

| Sample | Benzofuran uptake (wt %) | Dibenzothiophene uptake (wt %) | Benzoic Acid uptake (wt %) |
|---|---|---|---|
| FC | 2.443 | 0.018 | 0.519 |

DFT-based modeling results. The proper features of an ideal solid sorbent such as a biochar are not limited to a large surface area and a high free volume; appropriate interactions between the adsorbate molecules and the solid sorbent are also considered. Adsorption of the target organic compounds on the biochar is partly a thermodynamic process based on differences in the adsorption energies of different compounds. Therefore, energy-based data can clarify the adsorption strength for different adsorbate molecules, indicating the capability of the biochar to adsorb the gases before they are released to the atmosphere.

The results discussed below indicate how a quantum-based density functional approach can be used to predict the adsorption behavior of a selected group of gas molecules, normally emitted from the bitumen surface, on the N-rich surface of algal biochar. A group of six adsorbate molecules (three O-containing and three S-containing compounds) supposed to interact with four active zones of the biochar surface containing N-functionals of amide, amine, pyridine, and pyrrole were selected. The O-containing compounds are benzoic acid, benzofuran, and hexanal (an aldehyde molecule). The S-containing compounds are dibenzothiophene, 3-pentylthiophene, and hexanethiol. These compounds were selected based on the role of polar emissions including sulfur and oxygen elements as precursors of secondary organic aerosols. At temperatures relevant to the life cycle of bitumen materials, hydrocarbons constitute a large fraction of bitumen emissions. However, O-containing and S-containing emissions, contributing 1-14% and 5-30% of the total emissions, respectively, constitute a greater fraction at high temperatures. Solar exposure is believed to result in a 700% increase in emission of S-compounds, a 400% increase in O-compounds, and a 300% increase in hydrocarbons.

The highly aromatic S-compounds in bitumen emissions include chemical structures representing benzothiophenes and dibenzothiophenes; the complex mixture of 0-containing emissions includes chemical structures representing benzofurans and dibenzofurans, commonly found in complex petroleum-based mixtures.

A biochar surface generally includes many O-containing functional groups, including phenols, alcohols, ketones, lactones, and carboxylic acids. However, the active zones targeted here have N-containing functional groups, since the distinctive performance of the algae biochar compared to other biochars is attributed to the function of N-compounds in algae biochar. The area of each active zone is not limited to an individual N-functional group, but also contains a small portion of the biochar surface coordinated to the N-functional group, to simulate the chemical environment around the functional. This is of interest because the nature of substituents (e.g., electron-withdrawing or electron-donating characteristics) near the N-functional group may impact the eventual performance of the N-functional group and its subsequent interactions with gas molecules.

Figure 9:
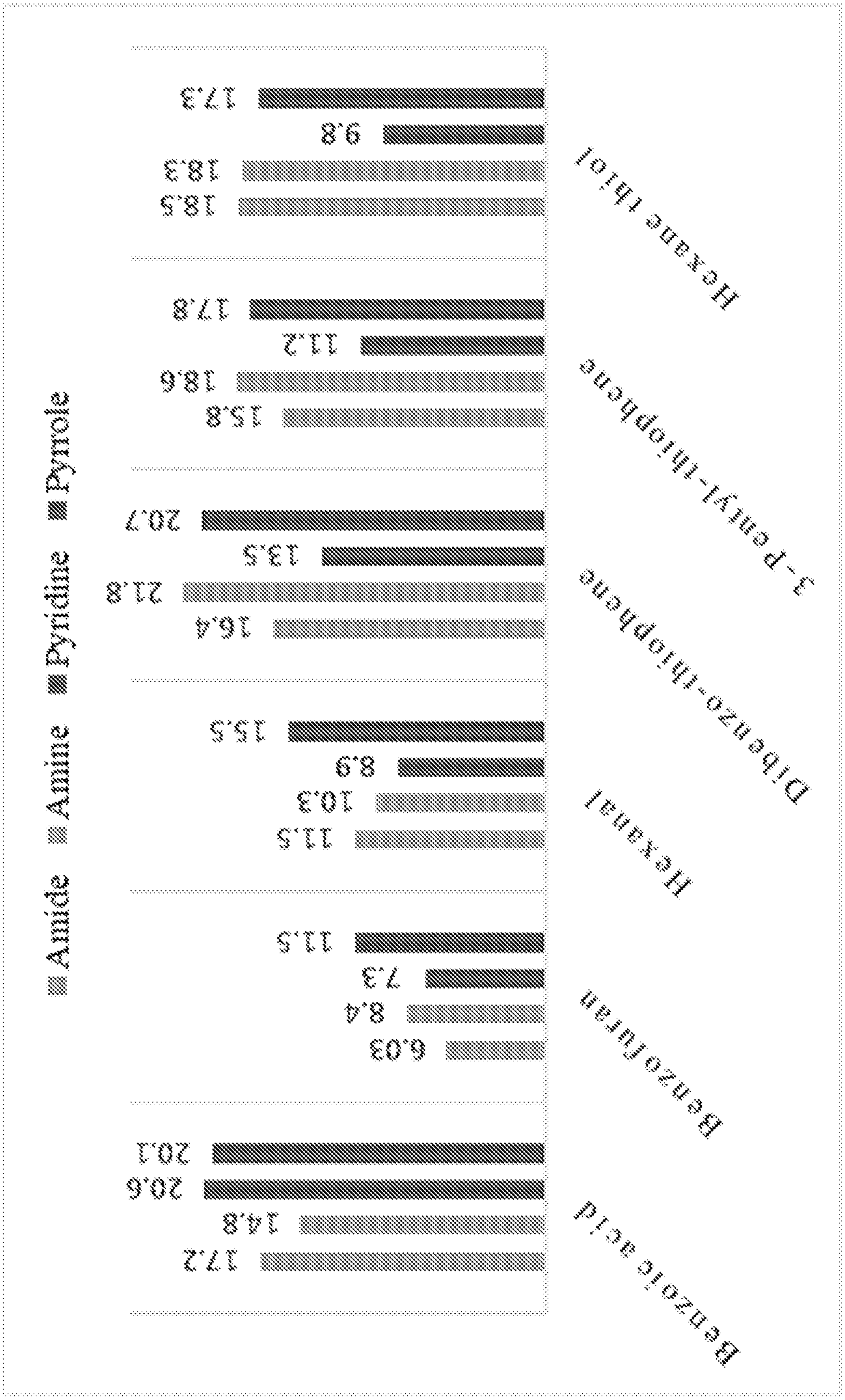
FIG. 9 shows a comparison of maximum adsorptions of six gas compounds on four N-containing active zones of an algal biochar.
Figure 10:
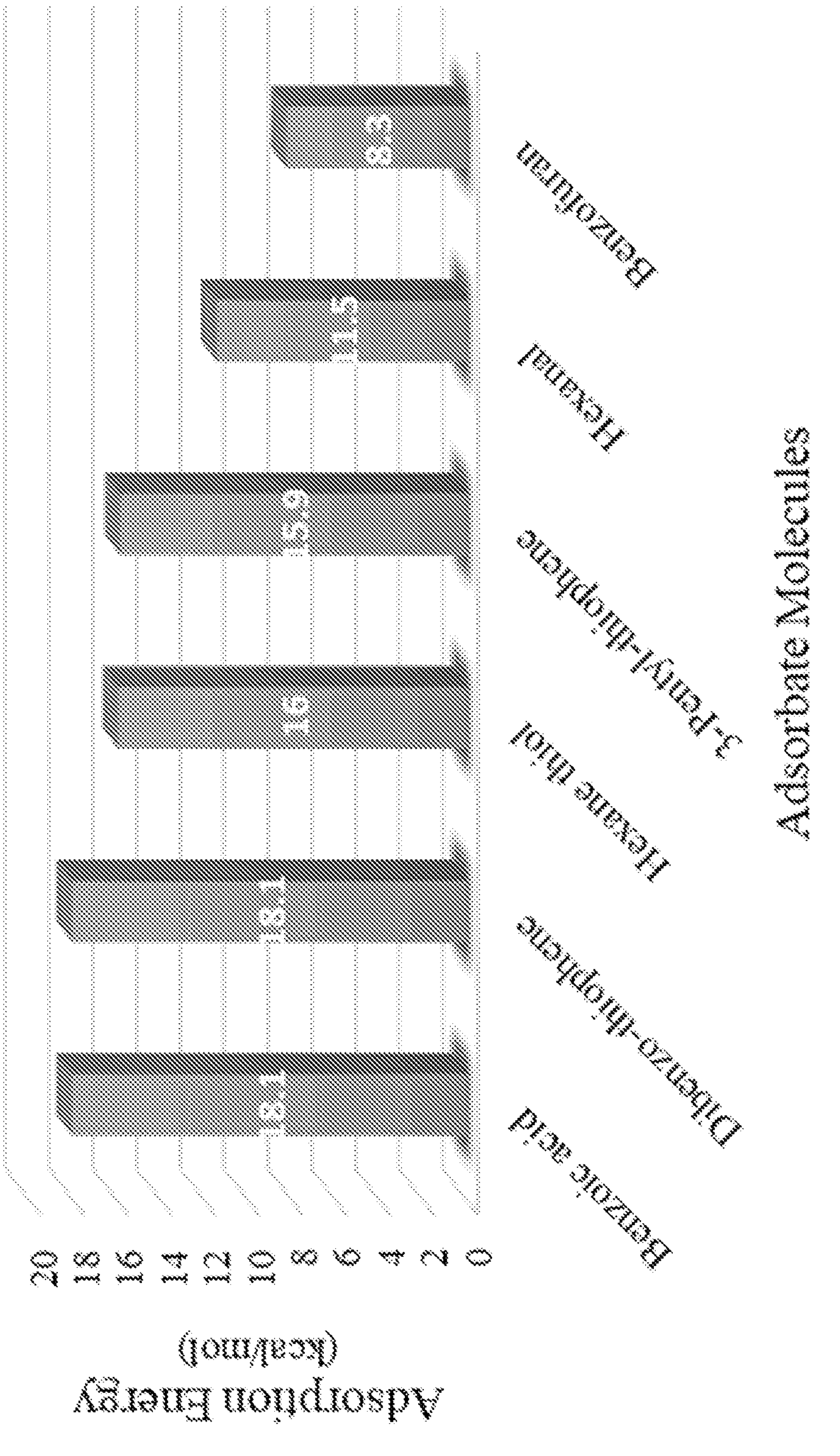
FIG. 10 shows comparison of average adsorptions of six gas compounds on four N-containing active zones of an algal biochar.

The results of interactions between the six gas molecules and the four active zones of biochar are shown in Table 15 and FIG. 9. Columns of FIG. 9 are related to the maximum adsorption of each gas on each active zone. The bars for each of benzoic acid, benzofuran, hexanal, dibenzothiophene, 3-pentylthiophene, and hexanethiol represent adsorption on amide, amine, pyridine, and pyrrole, from left to right. FIG. 9 shows the lowest adsorption for benzofuran compared to other gasses. To have a better evaluation of adsorption strength of each gas molecule, the average adsorption of each gas on four N-containing zones is plotted in FIG. 10. FIG. 10 confirms the low adsorption of benzofuran, with E=8.3 kcal/mol, and hexanal, with E=11.5 kcal/mol, compared to other gasses. Dibenzothiophene and benzofuran are two identified chemical compounds that are normally emitted from a bitumen surface. Based on DFT results, the distinction between their adsorptions (dibenzothiophene with average adsorption energy of 18.1 kcal/mol, and benzofuran with average adsorption energy of 8.3 kcal/mol) is so high that benzofuran is not believed to be well adsorbed by algae-based biochar. This discrepancy in adsorption strength implies that depending on the nature of interactions and thermodynamic stability of the newly formed complexes, the target biochar may selectively function as the sorbent for a specific group of organic compounds.

TABLE 15

The range of adsorption energy for interaction of six chemical compounds, normally emitted from a bitumen surface, with four active zones of an algal biochar surface containing N-functional groups.

| Adsorbate Molecules | Amide Zone | Amine Zone | Pyridine Zone | Pyrrole Zone |
|---|---|---|---|---|
| Benzoic acid | 16.9-17.2 | 8.6-14.8 | 13.0-20.6 | 14.8-20.1 |
| Benzofuran | 5.6-6.03 | 2.6-8.4 | 4.5-7.3 | 6.2-11.5 |
| Hexanal | 9.4-11.5 | 5.2-10.3 | 5.3-8.9 | 9.2-15.5 |
| Dibenzothiophene | 9.4-16.4 | 18.3-21.8 | 9.0-13.5 | 11.5-20.7 |
| 3-Pentylthiophene | 14.3-15.8 | 12.0-18.6 | 8.6-11.2 | 10.4-17.8 |
| Hexanethiol | 14.3-18.5 | 13.8-18.3 | 8.8-9.8 | 12.7-17.3 |

Interaction of benzoic acid and dibenzothiophene with N-components of the biochar surface. Benzoic acid is one the most common organic acids in the Earth's atmosphere and an important organic aerosol that reacts with OH, $NO_3$, and $SO_4$ radicals in the atmosphere. This simple aromatic acid is a weak acid (pKa=4.2) with irritating fumes at elevated temperatures. Benzoic acid is released to the environment in various ways, including biomass combustion and hot bitumen.

The adsorption reaction of benzoic acid by N-rich biochar was investigated by tracking the molecular interactions between this organic aerosol and four active zones containing N functional groups. Based on the energy results, the pyrrole zone (here, in the form of indole), and the pyridine zone (here, in the form of quinoline) have the best interaction with benzoic acid, evidenced by an $E_{ads}$ of ~20 kcal/mol, followed by the amide and amine zones at 17.2 and 14.8 kcal/mol, respectively.

Even for the best interactions (associated with the highest adsorption energies), no H-transfer or ionic interaction (e.g., between benzoic acid and the pyridine zone: $C_6H_5$—$COO^-$ . . . $^+HN$—Ar) was observed between acid and N-containing zones. The maximum adsorption energies for benzoic acid and the pyrrole zone and pyridine zone concern H-bonding and other intermolecular forces, including dipole-dipole and dispersion.

Due to the chemical nature of benzoic acid and amine (as a base), two possible chemical reactions between two components were investigated: a simple ion pair reaction ($C_6H_5$—$COO^-$ . . . $^+H_3N$—R); and an amidization reaction that occurs as the following reaction to produce R—NH—CO-Ar+$H_2O$, Carboxylic acid + Amine ⟶ Amine + $H_2O$.

However, neither of these two reactions were performed successfully, indicating that the interactions between this weak acid and base are dominated by the physical interactions rather than the chemical reactions. In the amidization reaction, the energy released from this reaction (−7.8 kcal/mol) is less than the physical interactions between the two components (−8.6 to −14.8 kcal/mol).

Dibenzothiophene, a sulfur-containing polycyclic aromatic compound consisting of a thiophene ring flanked by two benzene rings, belongs to the intermediate-volatile organic compounds that have been recognized as contributors to secondary organic aerosols. As one of the most abundant O-containing compounds in the atmosphere (the others are anthraquinone, 9-fluorenone, and dibenzofuran), dibenzothiophene is emitted from burning wood, incomplete combustion, and non-combustion resources such as bitumen. Dibenzothiophene is also found in crude oil and petroleum, from which it is removed before further use.

Along with benzoic acid, dibenzothiophene shows the maximum adsorption on the biochar model surface, with average adsorption energy of −18.1 kcal/mol. The best performance of this polycyclic aromatic compound is related to its interactions with the amine zone ($E_{ads}$=−21.8 kcal/mol) and the pyrrole zone ($E_{ads}$=−20.7 kcal/mol). In either complex, the S atom of dibenzothiophene takes advantage of an H-bonding interaction with the NH part of the amine or pyrrole group that brings a good thermodynamic stabilization for the newly formed adsorption complex. In addition, good adsorption for dibenzothiophene is provided by its polyaromatic nature and the relatively high density that it carries due to its large size. The binding (relative) distance, defined based on the two centers of mass of the targeted compounds, is 4.2 Å, which is a common range for the binding distance of aromatic planes. In this case, two polyaromatic compounds are arranged in a displaced-parallel (offset) orientation, which is a favorable arrangement in which then-electron repulsion of quadrupole/quadrupole interactions between two aromatic planes is minimized and the complex becomes stabilized.

Interaction of benzofuran with N-components of the biochar surface. Benzofuran and dibenzofuran are precursors to secondary organic aerosols; these precursors are often found in complex petroleum-based mixtures. Among the three O-containing gas molecules (benzoic acid, benzofuran, and hexanal), benzofuran has the least adsorption on the model surface of algae biochar. The best performance of benzofuran is its adsorption on the pyrrole zone (a substituted indole) with a stabilization energy of −11.5 kcal/mol. Its next best is its adsorption on the amine zone with a stabilization energy of −8.4 kcal/mol. Comparison of the adsorption complexes of dibenzothiophene-pyrrole zone with the benzofuran-pyrrole zone shows that while both structures benefit from a displaced-parallel arrangement with an H-bonding interaction, the former complex is stabilized much better than the latter complex, $E_{ads}$=−20.7 kcal/mol compared to $E_{ads}$=−11.5 kcal/mol. This energy difference highlights the importance of the number of aromatic rings in a polyaromatic compound (with the consequent electron density carried by those rings) on its π-π electron interactions.

Also, comparison of the arrangements and stabilization energies for the two adsorption complexes benzoic acid-pyrrole zone and benzofuran-pyrrole zone, further supports this hypothesis that the most effective non-bonding interactions in the benzoic acid complex compared to the benzofuran complex provide a higher stability for the former complex ($E_{ads}$=−20.1 kcal/mol) compared to the latter one ($E_{ads}$=−11.5 kcal/mol). Therefore, despite the smaller electron density of benzoic acid, due to its smaller size compared to benzofuran, the functional groups of benzoic acid perform better than those of benzofuran in adsorption on the surface of algal biochar.

Conclusion. This example demonstrates that microporous carbon materials derived from biomass feedstocks are significant for gas separation and purification applications. Sun exposure and elevated temperatures have recently been shown to be two influential factors in the aging of bitumen and the emission of volatile and semi-volatile organic compounds; the compounds emitted are potential precursors to ozone and to secondary organic aerosols, which are submicron (<2.5 μm) atmospheric aerosols with serious impacts on human health and the environment. The functionalized carbon provided by the thermochemical liquefaction of an algal feedstock is rich in N compounds due to a high content of protein and nucleic acids. Newly made biochar is shown to be an appropriate solid sorbent for a specific group of atmospheric aerosols.

The features of an ideal solid sorbent such as a biochar are not limited to a large surface area and a high free volume; other factors include appropriate interactions between the adsorbate molecules and the solid sorbent. Adsorption of the target organic compounds on the biochar is partly a thermodynamic process based on differences in the adsorption energies of different compounds. Therefore, energy-based data can clarify the adsorption strength for different adsorbate molecules, indicating the ability of the biochar to remove the particular gases from the atmosphere. Thus, absorption energy was considered as a criterion to assess the capability of the biochar surface to selectively remove bitumen emissions that would act as precursors for secondary organic aerosols.

This example used a series of quantum-based calculations in the framework of density functional theory (DFT) to investigate the interaction of six air pollutants (precursors to secondary organic aerosols) with four active zones of a model surface of an algal biochar, including N-functional groups of amide, amine, pyrrole, and pyridine. The six adsorbate molecules consisted of three O-containing compounds (benzoic acid, benzofuran, and hexanal) and three S-containing compounds (dibenzothiophene, 3-pentylthiophene, and hexanethiol). Based on DFT results measuring adsorption of the six molecules toward the N-rich surface of biochar, benzoic acid and dibenzothiophene showed the maximum average adsorption energy of 18.1 kcal/mol, and benzofuran showed the minimum average adsorption energy of 8.3 kcal/mol. Even for the best interaction, no H-transfer, no simple ion-pair reaction, and no amidization reaction occurred during the interactions, indicating that the interactions between this N-rich surface and the targeted air pollutant emissions are dominated by the physical interactions (H-bonding, dipole-dipole, and dispersion forces) rather than the chemical reactions. However, the size of the difference between the maximum (ΔE=−18.1 kcal/mol) and minimum (ΔE=−8.3 kcal/mol) average adsorption energies suggests that functionalized carbon derived from an algal biochar can perform as an appropriate solid sorbent for the selective removal of some hazardous bitumen emissions.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A bitumen composite comprising:

bitumen; and biochar, wherein the biochar comprises 1 wt % to 20 wt % of the bitumen composite, wherein the biochar comprises biochar derived from hydrothermal liquefaction of algae, and the biochar is functionalized with nitrogen-containing groups or compounds, oxygen-containing groups or compounds, or both.

2. The bitumen composite of claim 1, wherein the biochar comprises 1 wt % to 15 wt % of the bitumen composite.

3. The bitumen composite of claim 1, wherein the biochar comprises 1 wt % to 10 wt % of the bitumen composite.

4. The bitumen composite of claim 1, wherein the biochar comprises 1 wt % to 5 wt % of the bitumen composite.

5. The bitumen composite of claim 1, wherein the biochar comprises 5 wt % to 15 wt % of the bitumen composite.

6. The bitumen composite of claim 1, wherein the biochar comprises 5 wt % to 10 wt % of the bitumen composite.

7. The bitumen composite of claim 1, wherein the biochar comprises 10 wt % to 15 wt % of the bitumen composite.

8. The bitumen composite of claim 1, wherein the biochar comprises 15 wt % to 20 wt % of the bitumen composite.

9. The bitumen composite of claim 1, wherein the biochar comprises biochar derived from a combination of algae and swine manure.

10. A bitumen additive comprising the biochar of claim 9.

11. An asphalt comprising the bitumen composite of claim 1.

12. A method of making a bitumen composite, the method comprising:

liquefying biomass to yield biochar, wherein the biomass comprises algae and swine manure;

combining the biochar with bitumen to yield a modified bitumen, wherein the biochar is functionalized with nitrogen-containing groups or compounds, oxygen-containing groups or compounds, or both; and homogenizing the modified bitumen to yield the bitumen composite.

13. The method of claim 12, wherein liquefying the biomass comprises thermochemical liquefaction.

14. The method of claim 12, wherein liquefying the biomass comprises hydrothermal liquefaction.

15. The method of claim 12, further comprising combining the bitumen composite with an aggregate to yield asphalt.

16. The method of claim 12, wherein the biochar comprises 1 wt % to 20 wt % of the bitumen composite.

17. The method of claim 16, wherein biochar comprises 5 wt % to 15 wt % of the bitumen composite.

18. The method of claim 16, wherein biochar comprises 1 wt % to 5 wt % of the bitumen composite.

19. The method of claim 16, wherein biochar comprises 10 wt % to 15 wt % of the bitumen composite.

* * * * *